United States Patent [19]
Battista et al.

[11] Patent Number: 5,519,774
[45] Date of Patent: May 21, 1996

[54] METHOD AND SYSTEM FOR DETECTING AT A SELECTED STATION AN ALERTING SIGNAL IN THE PRESENCE OF SPEECH

[75] Inventors: Ralph N. Battista, Colts Neck; James R. Bress, Neptune; Hala E. Mowafy, Eatontown; Stanley Pietrowicz, Jersey City, all of N.J.

[73] Assignee: Bell Communications Research, Inc., Morristown, N.J.

[21] Appl. No.: 340,988

[22] Filed: Nov. 17, 1994

Related U.S. Application Data

[63] Continuation-in-part of Ser. No. 987,516, Dec. 8, 1992, abandoned.

[51] Int. Cl.⁶ ................................................. H04M 1/00
[52] U.S. Cl. ...................... 379/386; 379/372; 379/282; 379/351
[58] Field of Search ...................... 379/386, 372, 379/373, 351, 282; 381/51

[56] References Cited

U.S. PATENT DOCUMENTS 4,689,760   8/1987   Lee et al. ............................. 379/386

FOREIGN PATENT DOCUMENTS 0002462   1/1989   Japan ................................. 379/351

Primary Examiner—Jeffery Hofsass
Assistant Examiner—Jacques M. Saint-Surin
Attorney, Agent, or Firm—Leonard Charles Suchyta; James W. Falk

[57] ABSTRACT

A method and apparatus for detecting a dual tone alerting signal in the presence of speech for the purpose of initiating transfer of special service information on a telephone line is described. The apparatus includes two channels for separately detecting each tone. Each channel includes means for comparing the signaling energy around one of the tones with the energy in a selected weighted guard band portion of the voiceband. Based on this comparison, a determination is made whether a tone is or is not present. A pulse signal formed from the coincidences of tone detection in each channel is used by timing circuitry to determine whether the dual tone alerting signal is actually present or whether speech energy caused both tones to be erroneously detected (talkoff). Characteristics of this pulse signal are analyzed to determine whether an alerting signal is present. An alerting signal is detected if parameters of these characteristics fall within determined ranges, which ranges are continuously updated based on the parameters of these signal characteristics determined from previously detected alerting signals. If, however, the signal characteristic parameters of a present potential alerting signal match those of a previously determined talkoff signal, a talkoff is presumed even when these parameters fall within ranges in which an alerting signal would otherwise be detected.

18 Claims, 20 Drawing Sheets

METHOD AND SYSTEM FOR DETECTING AT A SELECTED STATION AN ALERTING SIGNAL IN THE PRESENCE OF SPEECH

CROSS REFERENCE TO RELATED APPLICATIONS

This application is a continuation-in-part of Ser. No. 07/987,516, filed Dec. 8, 1992, now abandoned. This application is also related to U.S. Pat. No. 5,353,342, issued Oct. 4, 1994, which has same filing date and assignee as the parent application hereof.

TECHNICAL FIELD

The present invention is related to methods and systems for recognizing alerting signals and, in particular, to methods and systems for detecting an alerting signal at a selected station in the presence of speech.

BACKGROUND OF THE INVENTION

Inband tone signaling using combinations of discrete frequencies has long been used in the telephone system. The primary advantage of inband tone signaling is that it shares the same spectrum that normally carries customer speech to transmit signal and control information. Sharing the voiceband is essential in situations where bandwidth is limited or dedicated control channels are either too costly or degrade the quality of voice transmission. One of the most common inband tone signaling systems in use in the telephone network today is touch tone dialing.

All inband tone signaling systems are premised on the belief that tone signals can be reliably detected. In touch tone dialing, for instance, reliable and accurate detection of 16 dual tone combinations is necessary to prevent improper routing of call attempts. Tone signal detector reliability translates into three basic performance criteria. The first and obvious criteria is the detector's ability to receive tone signals over the entire range of expected signal characteristics. These include the physical layer parameters such as tone signal level, frequency and duration. The two other performance criteria are somewhat unique to tone signal detectors and are meant to address the problems of receiver talkoff and talkdown.

One of the most common problems with inband tone signal detection is receiver talkoff. Talkoff occurs whenever a tone signal detector erroneously accepts a signal imitation produced by either speech or music as a valid alerting signal. Studies, experimentation and experience have all decisively confirmed that human speech can imitate some of the spectral and temporal properties of tone signals. The combination of consonants, vowels and syllables that frequently occur in an ordinary telephone conversation can cause a tone signal detector to talkoff. One of the challenges in designing a tone signal detector is making the detector non-responsive to these signal imitations.

Another problem associated with inband tone signal detection is receiver talkdown. Talkdown occurs whenever a tone signal detector fails to recognize a valid tone signal because it was masked by extraneous energy present on the line. In some situations, tone signals may have to compete with speech, music and other background noise. The presence of these complex signals distorts valid tone signals and impairs their detection.

Talkoff and talkdown are two critical measures of performance for a tone signal detector. They respectively describe the detector's ability to resist signal imitations and to recognize valid tone signals obscured by speech, music or noise. In the telephone network, emphasis has been traditionally placed on receiver talkoff performance because talkdown problems were circumvented by minimizing all interference on the line during tone signal pulsing. In touch tone dialing, for example, the transmitter of an ordinary telephone is muted when a dialing key is pressed. This prevents any customer speech or background noise from distorting the dual tone signal and allows central office receivers to be optimized to prevent talkoff during the intervals between key presses. Good talkoff performance was necessary for touch tone receivers but good talkdown performance was not necessary.

In recent years, new telephone services and advanced screen based telephony platforms such as the Analog Display Services Interface (ADSI) have been developed that require reliable tone signaling between the Stored Program Control Switching System (SPCS) and the Customer's Premises Equipment (CPE). These services and platforms, encouraged by many technological advances, are transforming the conventional telephone set into a sophisticated integrated terminal with a liquid crystal display and microprocessor, if not digital signal processor, with intelligence. One such service that depends upon reliable tone signal detection is Calling Identification Delivery on Call Waiting (CIDCW).

CIDCW is a service that complements the popular on-hook Calling Identification Delivery (CID) service by providing the calling line identification in the off-hook case for calls that are waited by the call waiting feature. For example, two parties, a near end party and a far end party, have a stable connection established between them and the near end party is a subscriber to the CIDCW service. When a third party trying to call the near end party finishes dialing the near end party's number, audible ringing is returned to the third party. A telephone switch recognizes that a call is destined for the near end party and begins to execute the CIDCW service routine. The switch line splits the connection, essentially muting the far end party. A tone generator is attached to the near end party's line at the end office and the normal call waiting signal, a burst of about 300 ms of a 440 Hz tone, is sent to alert the near end party that a call is waiting. Appended to the call waiting signal is a short burst of a special machine detectable alerting signal intended to prompt the near end party's CPE. Upon detection of this special tone signal, also known a CPE Alerting Signal (CAS), the near end party's CPE mutes the handset, sends an acknowledgment tone signal (ACK) back to the SPCS, places an FSK data receiver on the line and awaits the calling line identification information. The acknowledgment tone signal completes the tone signal handshake with the SPCS and signals the SPCS to begin data transmission. Shortly after data transmission is complete, the SPCS reconnects the near end party and far end party. At about the same time, the near end party's CPE unmutes the handset, decodes and displays the calling line information. The near end party can then make a decision as to whether or not he or she wants to take the incoming call.

The key to the successful operation of the CIDCW service rests in the reliable detection of the tone signals exchanged between the SPCS and CPE. Because of the nature of the signaling environment, the weakest link in the tone signal handshake is the detection of the CAS. For applications like CIDCW, good CAS detector talkoff and talkdown performance is critical.

CAS detector talkoff is a prime consideration in CIDCW. Because CIDCW is a service that can asynchronously interrupt a stable two way call at any time, the CAS detector must remain active awaiting a CAS signal for the entire duration of the call. This places the CAS detector at the risk of talkoff because it is constantly exposed to speech from both the near end and far end parties. In general, the longer a tone signal detector is exposed to speech, the greater the chance of talkoff. In CIDCW, CAS detectors are placed under an extreme talkoff condition.

Another factor that makes CIDCW an extremely difficult application for CAS detectors is the level of the pre-emphasized near end party speech. Speech level is one factor that negatively affects all tone signal detectors regardless of the frequency or temporal pattern of the tone signal. For a typical detector, the number of talkoffs that occur within a given period of time increases exponentially with increasing speech levels. Low speech levels are still quite capable of producing talkoffs, however, they are much less common. For this reason, system designers try to limit the level of speech incident upon the tone signal detector. In CIDCW, the CAS detector is "blasted" with speech from the near end party, speech that is heavily pre-emphasized by the near end party's telephone transmitter. The telephone transmitter provides increased gain at frequencies in the upper portion of the voiceband to counteract the effect of the typical loop and aids in making the speech more intelligible. However, it also raises the level of potential talkoff signals in the upper voiceband.

The impact of a CAS detector talkoff in CIDCW is a degradation of the quality of normal telephone service. If the CAS detector is talked off and erroneously accepts a signal imitation produced by speech, the near end party's CPE will interrupt the conversation by muting the handset and sending back an acknowledgment tone signal. Since the SPCS did not originate the CAS, the far end party will unintentionally receive the acknowledgment tone signal at a very undesirable listening level. Furthermore, the connection between the near end party and far end party remains interrupted until the CPE times out waiting for data. This interval is on the order of one half of a second. To prevent these unnecessary and disrupting interruptions, CAS detector talkoff must be minimized.

Unlike previous tone signal detectors used in the telephone network, the CAS detector for CIDCW also needs to exhibit good talkdown performance. Although the far end party is muted when the CAS is generated, speech, music and noise can still corrupt the signal by gaining access to the line through the near end party's transmitter. If the near end party happens to be speaking when a CAS is sent, a collision of tone signal energy and near end party speech occurs. The CAS detector connected across the tip and ring terminals observes this combined signal and must extract the CAS from within the envelope of speech. Failure to detect the CAS leads to a service failure because no calling line identification is delivered when the acknowledgment tone signal is not returned.

For applications like CIDCW, good CAS detector talkoff and talkdown performance is therefore critical. The design freedom available in previous applications to completely sacrifice talkdown performance in favor of talkoff performance can no longer be exercised. In general, the two factors that affect talkoff and talkdown performance are the architecture of the tone signal detector and the timing algorithm used to screen potential alerting signals. The architecture of the tone signal detector has the most influence on detector performance, but overall performance can be significantly enhanced by use of a "smart" timing algorithm. To illustrate how detector architecture affects performance, one of the simplest prior art architectures, shown in FIG. 1, can be considered. This detector 10 utilizes for each channel 11 and 12 a narrowband filter 13 around each signaling frequency f1 and f2. A detect condition is indicated when the power of each filtered signal coincidentally exceeds a preset threshold, as determined by threshold circuits 14, for some minimum duration of time.

The primary problem with the simple filter tone signal detector in FIG. 1 is that it is highly susceptible to talkoff. Experimentation using a digital signal processing simulation and a simple timing algorithm revealed that this circuit often responds to signal imitations produced by ordinary telephone speech. Simple filter tone signal detectors designed for single frequency tone signals are highly vulnerable to talkoff. Dual tone and multi-tone simple filter tone signal detectors are more immune to speech simulation. However, experimentation has proven that speech contains enough energy at non-harmonically related frequencies to often trigger dual and multi-tone simple filter detectors that have a low sensitivity threshold. Simple filter detectors with a high sensitivity threshold perform significantly better. They are not practical, however, for use in a network that introduces loss on the alerting tone signals. The primary advantage of the simple filter detector is its excellent talkdown performance.

To combat the talkoff problem, other prior art tone signal detectors not only measure the energy in the tone signal frequency bands, but also condition detection upon tone signal purity. The method that was used in the touch tone receivers for some of the early electronic switching systems involved comparing the power of each tone signal frequency band with the total power contained in the remaining non-signaling portion of the voiceband. The general class of these detectors became better known as tone signal detectors that employ guard. A functional block diagram of a generalized prior art tone detector with guard is shown in FIG. 2. The basic components needed to implement each single channel 21 and 22 for the guard detector 20 are a narrowband filter 23 centered around one of the signaling frequencies (f1 and f2), a bandreject filter 24 to highly attenuate the other frequencies that comprise the tone signal and a complex comparator 25 that obtains the ratio of the power of one signaling tone to the power in the rest of the voiceband and compares it against a preset threshold. The purpose of the bandreject filter 23 is to attenuate the other signaling tone frequencies so that an accurate representation of the non-tone signal energy in the voiceband can be extracted. Each complex comparator 25 produces an output signal based upon the relative power difference between the signaling tone and the energy in the non-signaling portion of the voiceband. If the ratio of the signaling tone power to the non-tone signal power in the voiceband is above a preset threshold, the incoming signal seems to be dominated by a signaling tone and the complex comparator produces a logic 1 output. Otherwise, if the ratio is below the preset threshold, the incoming signal appears to be dominated by speech energy and is likely to be a talkoff. In this case, the complex comparator produces a logic 0 output.

The signal tone and voiceband power comparison can be performed almost instantaneously in real time by analog circuitry or at periodic intervals in a sampling system. The outputs of the comparators 25 are ANDed together to form a single binary data stream that is timed by the timing algorithm. The binary data stream will contain a series of pulses that indicate the result of the comparison between the power ratio and the preset threshold as a function of time.

The guard detector of FIG. 2 permits improvements in talkoff performance because most talkoff signals can be readily identified by the presence of extraneous energy in the voiceband. The non-signaling energy in the voiceband became known as guard energy because it was used to help guard against talkoff signals. Similarly, the ratio of signaling tone power to guard signal power was called the signal-to-guard ratio. Most speech imitations would have relatively poor signal-to-guard ratios while true tone signals in the absence of interference would relatively have large signal-to-guard ratios, usually in excess of 15 dB.

Prior art guard detectors, such as one in FIG. 2, were designed for applications where talkoff was the primary concern. In fact, touch tone receivers were the primary application at the time. As previously mentioned, talkdown problems for the touch tone signaling system were circumvented by minimizing all interference when tone signals were pulsed. While the talkoff performance of guard detectors that utilize all available spectrum power is highly desirable, such detectors are a poor choice for applications like CIDCW. Because speech energy cannot be entirely controlled when the CAS is generated, there is a good probability that significant speech energy emanating from the near end party will collide with the CAS. A guard detector that looks at the entire non-signaling portion of the voiceband will almost always reject speech-corrupted tone signals and be talked down.

Another variation of the guard concept that is more convenient to implement on digital signal processors is the method of sampling the energy at a few points in the voiceband spectrum to use as guard. If the energy at any one of these points passes a preset threshold, the equivalent of the comparator output signal is set to a logic 0 as the incoming signal is thought to be a talkoff. Otherwise, if sufficient signaling tone energy is present and the energy at each of these samples is below the preset threshold, the comparator output signal is set to a logic 1.

The major advantage of this prior art design is that only a small portion of the voiceband energy is used for guard energy. This method is a further enhancement over the former guard detector because it is more tolerant to the presence of speech. If the sampled frequency points are chosen in the upper portion of the voiceband where speech power is less prominent, this detector will be able to detect more CAS signals that are corrupted by speech. By controlling the threshold, the balance between talkoff and talkdown performance can be altered. However, one drawback of this design is that sampling a few points of the frequency spectrum proves too inflexible to achieve very good talkoff and talkdown performance. The granularity in performance setting is too coarse and is much too susceptible to the position of the spectrum samples.

In virtually every tone signal detector design, talkoff performance and talkdown performance are not independent of each other. In fact, the relationship between talkoff performance and talkdown performance is typically inverse. Good talkdown performance is usually achieved at the expense of talkoff performance. The simple filter detector of FIG. 1 demonstrated this behavior. Conversely, good talkoff performance is usually achieved at the expense of talkdown performance. The guard detector of FIG. 2 exemplified this concept.

The tradeoff between talkoff and talkdown performance has an inherent logical explanation. In order to improve talkoff performance, a tone signal detector must be made more selective in what it accepts as a valid tone signal. The more selective a tone signal detector becomes, the more criteria an incoming signal must pass before it is recognized as a valid tone signal. As the detector becomes more selective and rejects more talkoffs produced by speech, it also begins to mistake valid tone signals obscured by speech as talkoffs. This in turn causes more valid tone signal to be rejected and worsens talkdown performance. For the opposite approach of improving talkdown performance, the reasoning holds that liberal detectors designed to accept signaling tones that are corrupted by speech or music are more likely to accept signal imitations produced by speech. Consequently, talkoff and talkdown performance are offsetting weights on a balance beam whose rest position is designed to favor either one or the other depending upon the application.

For every inband tone signaling application, the balance between talkoff and talkdown performance needs to be evaluated by the system engineer. A tone signal detector architecture that provides a mechanism to adjust the talkoff and talkdown balance is highly desirable. With the previous tone signal detector designs, there were two problems both of which are related to setting and controlling this balance. On some tone signal detectors, such as the simple filter detector, the talkoff and talkdown performance of the circuit was virtually fixed and unadjustable. Only slight improvements could be made by changing system variables. On other detectors such as the guard detectors, a crude and course means of adjustment was provided through the selection of the signal-to-guard ratio threshold. Adjustment via the signal-to-guard ratio provided a greater degree of control, but again, only small to moderate performance improvements could be realized. Neither of these designs could be successfully used for services like CIDCW because the correct balance of talkoff and talkdown performance could not be achieved.

An object of the present invention is to detect an alerting signal comprising multiple tones at predetermined frequencies in the presence of speech, with both improved talkoff and talkdown performance.

SUMMARY OF THE INVENTION

The present invention advantageously balances both talkoff and talkdown performance through the selection of a guard band and a weighting function applied to the guard band. Specifically, rather than taking the entire non-signaling portion of the voiceband as a guard band or just a few discrete samples of the spectrum, the present invention selects only a portion of the voiceband to use as a guard band, and weights and sums the power in the guard band according to a predetermined frequency-dependent weighting function. Through the use of selective weighted guard bands, the detector of the present invention not only provides improved control over talkoff and talkdown performance but provides better overall performance.

For applications such as CIDCW, described hereinabove, the detector of the present invention employs two channels to separately detect each of two tones that comprise the CPE Alerting Signal transmitted to the customer equipment. In each channel, the power in a narrow band around one of the signaling bands is compared with the power in the predetermined guard band for that channel, as weighted by a predetermined frequency dependent function for that channel. In each channel a tone is "detected" when the ratio of signaling band power to weighted guard band power exceeds a predetermined threshold. A CAS is detected only when parameters associated with certain characteristics of a pulse signal formed from the coincidence of each channel's tone detect signal fall within ranges that define an acceptable alerting signal. These characteristics include an initial pulse length in a defined time window and a score determined from the lengths of separate pulses occurring within that window. The ranges of initial pulse width and score, which define a region for alerting signal detection, are adaptively updated based on the characteristics of previously received and detected legitimate alerting signals. When, however, the characteristics of a present pulse signal match the characteristics of a previously identified talkoff signal, even when falling within the region that defines a legitimate alerting signal, the present "detection" is presumed rather to be a talkoff.

DETAILED DESCRIPTION

Figure 3:
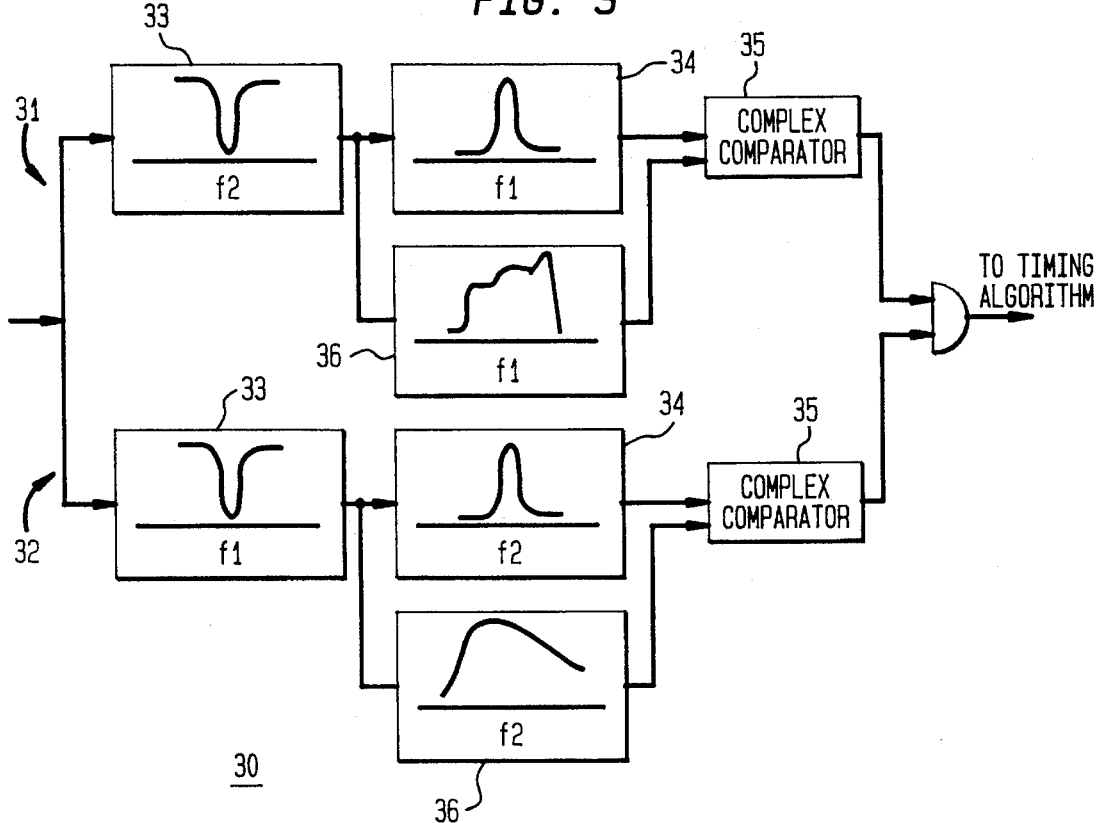
FIG. 3 is a block diagram of the weighted guard tone detector of the present invention.

A generalized block diagram of the tone signal detector with weighted guard of the present invention is shown in FIG. 3. One principle of the weighted guard detector is that only a small section of the voiceband is chosen as guard because experimentation has shown that in circumstances where speech energy is present on the line, the entire voiceband is just too overwhelming as a guard agent. Significantly better talkdown results were achieved without losing much talkoff performance when selected portions of the voiceband were chosen. As illustrated in FIG. 3, neither the guard band or the weighting function need to be the same for each channel.

Figure 1:
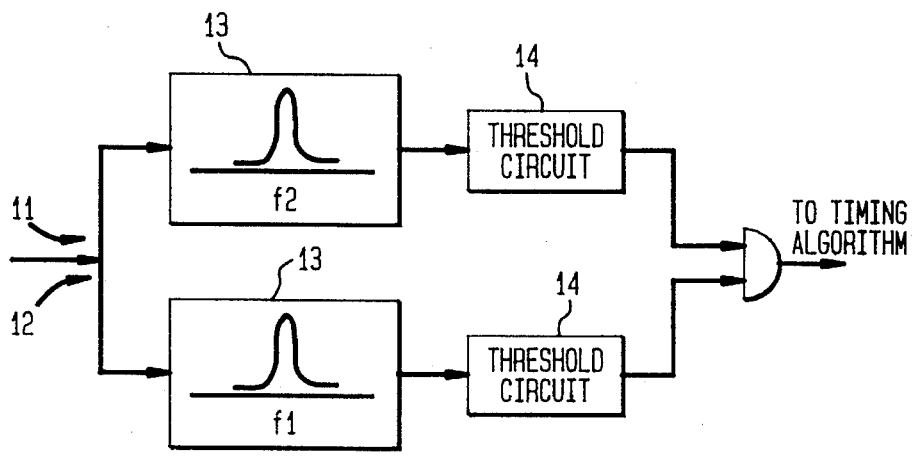
FIG. 1 is a block diagram of a prior art simple filter tone detector.
Figure 2:
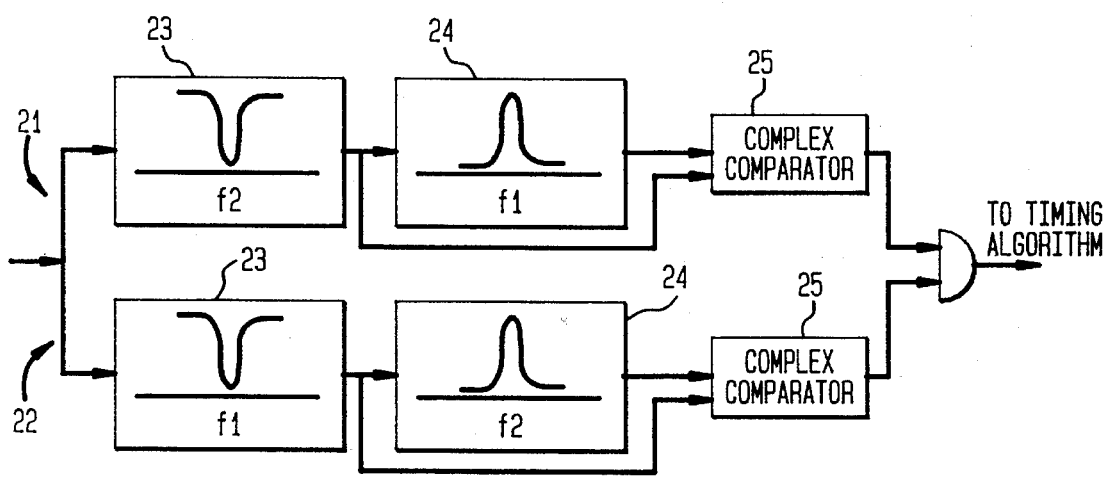
FIG. 2 is a block diagram of a prior art guard tone detector.

As illustrated in FIG. 3, the weighted guard tone signal detector 30 includes for each channel 31 and 32 a bandreject filter 33, a bandpass filter 34, and a complex comparator 35, as does the guard tone signal detector of FIG. 2. Each channel, however, further includes a weighting filter 36. Each bandreject filter 33 allows only one signaling tone to pass unattenuated along with the remaining portion of the voiceband. Each bandpass filter 34 extracts the energy of the signaling tone, and the weighting filter 36 weights and sums the energy in the selected guard band to produce a guard signal output. The signaling tone energy and guard signal output are inputted to the complex comparator 35 that determines the power of each signal, forms the ratio of signaling tone power to weighted guard signal power and compares it against a preset threshold of 0 dB. If the power ratio is greater than 0 dB, the complex comparator 35 produces a logic 1 output. Otherwise, it outputs a logic 0. The logic signal outputs of both complex comparators 35 are ANDed together and the resultant signal is the single binary data stream used by the timing algorithm.

Final determination of the guard band and weighting function can only be done through an iterative trial and error process using experimental results as described hereinafter. However, some generalization can be made to help in the initial selection of these system parameters. For high performance talkoff and talkdown tone signal detectors, the guard band should always be chosen from the upper portion of the voiceband. Preferably, the guard band should be between the frequencies of 2000 and 3000 Hz. Long term spectral plots of telephone speech indicate that the majority of speech energy is concentrated below 1000 Hz. Above 1000 Hz, speech energy tapers off. However, significant energy still remains between 1000 and 2000 Hz. Above 2000 Hz, speech energy is present in much smaller amounts and experimental results indicate that speech simulations of non-harmonically related tone signals usually contain energy within this band. Therefore it is an ideal guard band for high performance talkoff and talkdown tone signal detectors.

The weighting function is really a filtering device that inserts different degrees of attenuation as a function of frequency. It conceptually weights each frequency in the band and linearly combines the result to form a single guard signal. The weighting function must have two primary characteristics. One, the 3 dB bandwidth, defined as the bandwidth between the points on the characteristics that are 3 dB below the peak, must be adjustable. Second, the rate of rolloff of the characteristic curve must also be adjustable.

The general shape of the weighting function should be chosen so that it provides minimum attenuation at guard frequencies that are most likely to be present when a talkoff occurs and should provide maximum or significant attenuation at frequencies that are commonly present in speech. While individual research may result in a better selection of guard for tone signals of specific frequencies and duration, experimental results indicate that some of the most likely frequencies to accompany talkoff signals produced by speech are those that are nearby the signaling tones of the tone signal. Typically, these frequencies are between 1% and 5% of the nominal signaling tone frequency. This approach is optimum when the signaling tones are in the upper voiceband. A simple butterworth filter can be used as the weighting guard filter.

Once the general shape of the weighting guard filter is chosen according to the above recommendations, it needs to be fine tuned through an iterative experimental procedure. Because speech is a highly complex signal that is difficult, if not impossible, to describe by a single short term model that represents the universe of all speakers, both the 3 dB bandwidth and the rolloff rate of the weighting filter need to be adjusted using experimental results to achieve the desired performance characteristics.

Before the tuning procedure can begin, the guard band and general weighting function need to be already chosen, the timing algorithm completed and the performance requirements for talkoff and talkdown set. When selecting the talkoff and talkdown requirements, one must bear in mind that all inband tone signal detectors have some degree of failure in relation to talkoff and talkdown. There is no such device that is perfect in these areas. Performance requirements need to be chosen for talkoff and talkdown for the case of an average speech level and average signaling tone level.

The first step in the tuning process is to perform a tone signal detector talkdown test by mixing a tone signal at the average signal tone level with a speech source set to the average speech level. For CIDCW, the average signaling tone level is −22 dBm and the average speech level is −19 dBm. Speech level should be measured according to Method B of Recommendation P.56 *Objective Measurement of Active Speech Level* published in the CCITT Blue Book, Volume V *Telephone Transmission Quality*, 1989. Because the source of speech interference in CIDCW can only be the near end party, appropriate measures to simulate the near end party's telephone transmitter response are necessary. Although telephone handset transmitters vary considerably, a reasonable frequency response is a straight line approximation with positive slope from 300 Hz to 3000 Hz over a log-frequency scale, with the response at 300 Hz down 5 dB relative to 1000 Hz and the response at 3000 Hz up 5 dB relative to 1000 Hz. Perform the talkdown test and periodically adjust the 3 dB bandwidth of the weighting guard filter so that the target talkdown performance is met. If experimental talkdown results are below the target goal, reduce the 3 dB bandwidth. Otherwise, increase it until the target goal is met.

Step two of the tuning process requires a talkoff test using the average speech level that is expected to interfere with the tone signal; run a talkoff test by exposing the detector to a minimum of 100 hours of typical telephone speech and record the number of talkoffs. If this number meets the target talkoff performance goal, filter iteration can either stop, leaving the performance as measured, or the 3 dB bandwidth of the weighted guard filter can be further adjusted to shift the balance slightly and trade off some talkoff performance for improved talkdown performance. If changes are made, repeat steps one and two. If, however, the measured talkoff performance is below expectation, reduce the roll off rate of the weighting guard filter and repeat the talkoff test until the target talkoff goal is met. Next, repeat the talkdown test in step one and continue to adjust the 3 dB weighting guard filter bandwidth. Repeat steps one and two until both target talkoff and talkdown performance goals are satisfied. If, in the process of adjusting the 3 dB bandwidth of the weighting guard filter, the bandwidth decreases below tone signal transmitter tolerances, terminate the procedure. The target talkoff and talkdown performance goals cannot be reached for this system using the present guard band and weighting guard filter function. Select another guard band higher in the voiceband and repeat the entire procedure.

Figure 4:
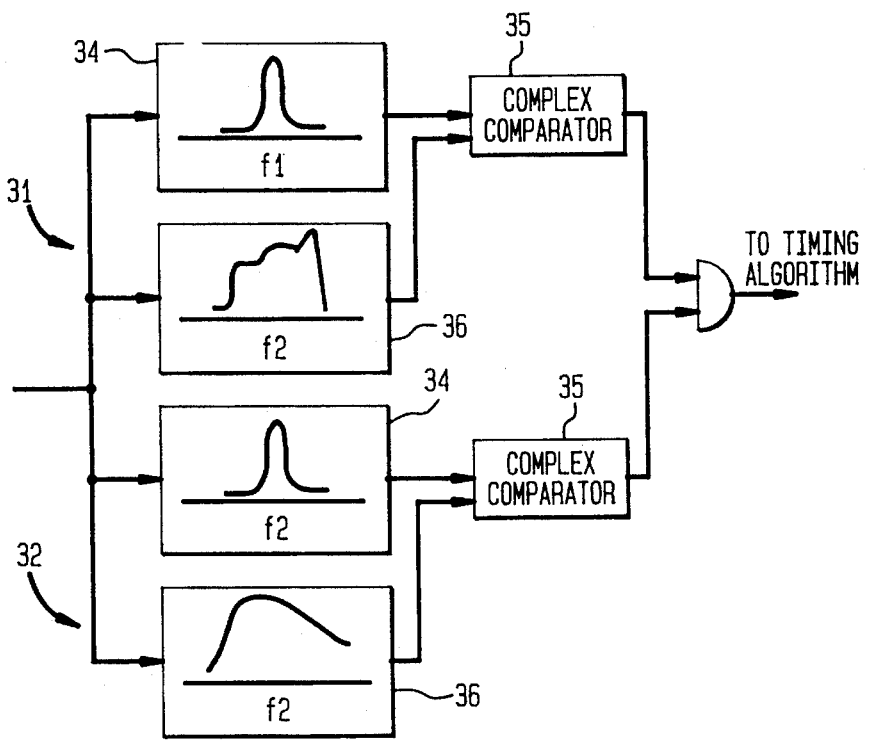
FIG. 4 is a simplified block diagram of the weighted guard tone detector of FIG. 3.

In some situations, the diagram of FIG. 3 can be simplified by taking advantage of some common characteristics between filter devices. The purpose of the bandreject filter 33 is to allow as much of the voiceband as possible to pass without modification along with one and only one of the signaling tones that comprise the tone signal. All other signaling tones in the tone signal are to be highly attenuated. This is necessary to prevent the other signaling tones in the tone signal from acting as guard. Without the presence of bandreject filter function, a guard detector would not operate. Typically, the signaling tones are chosen so that they are not harmonically related and are separated by a significant amount of bandwidth. Since the weighting function will be chosen around each signaling tone, it is likely that the weighting guard filter will provide sufficient attenuation at the other signaling tones in the tone signal. The attenuation that is necessary is equal to (A−B) dB, where A is the highest expected signal tone level in dBm and B is the threshold sensitivity of the channel in dBm. If the attenuation is sufficient, then the bandreject filter 33 can be eliminated, as shown in FIG. 4. In FIG. 4, the same numerical designation is given to corresponding elements in FIG. 3.

Figure 5:
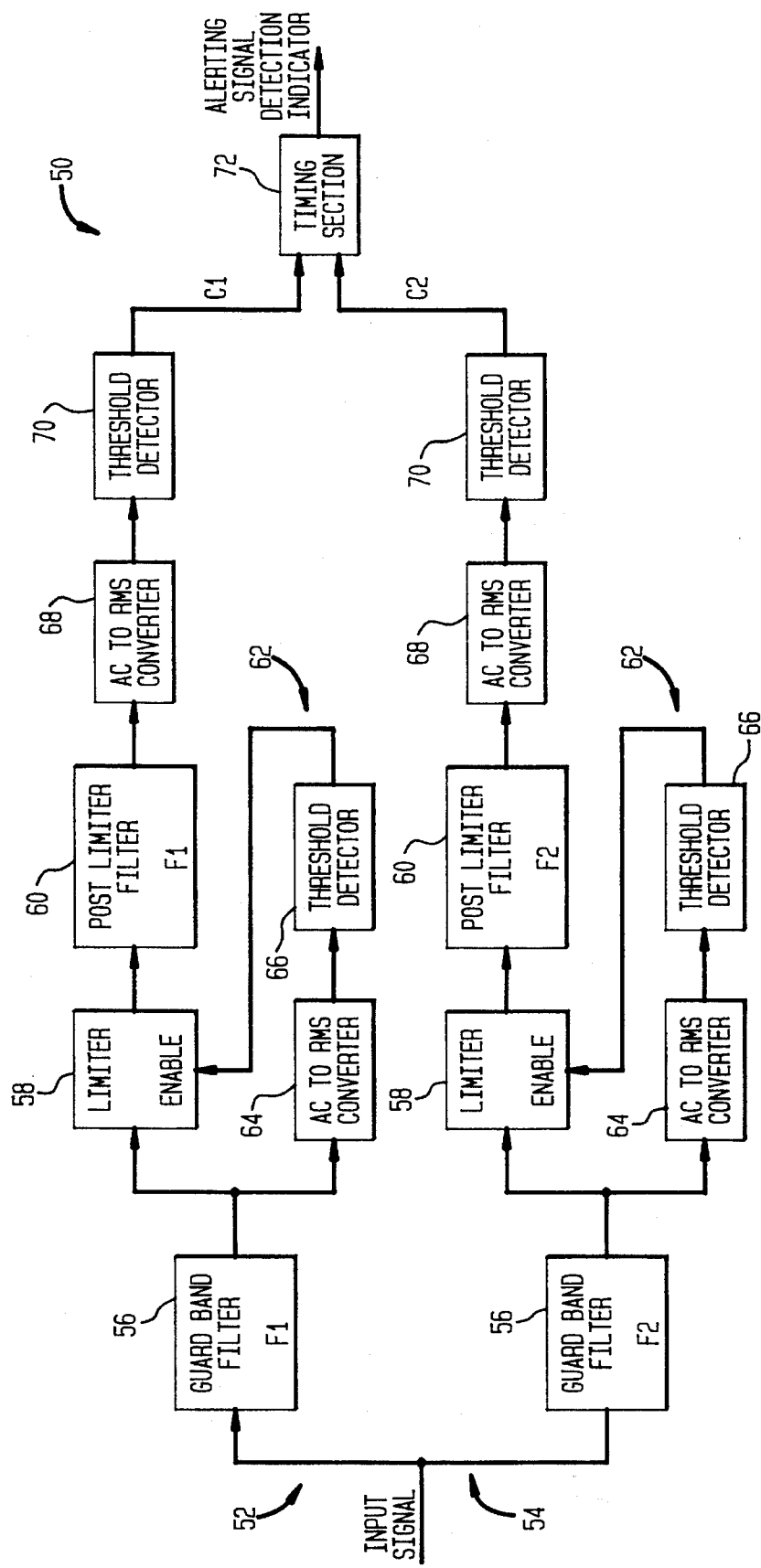
FIG. 5 is a schematic block diagram illustrating a circuit implementation of the weighted guard tone detector of the present invention.
Figure 6A:
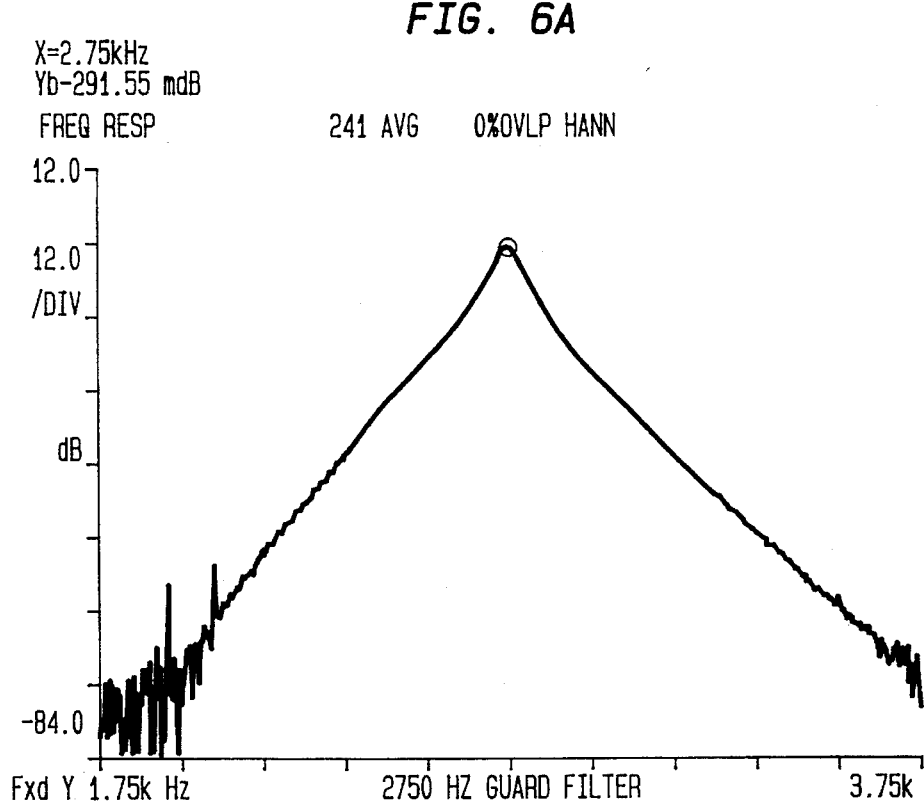
FIG. 6A is a graph illustrating the filter characteristics of a 2750 Hz guard filter.
Figure 6B:
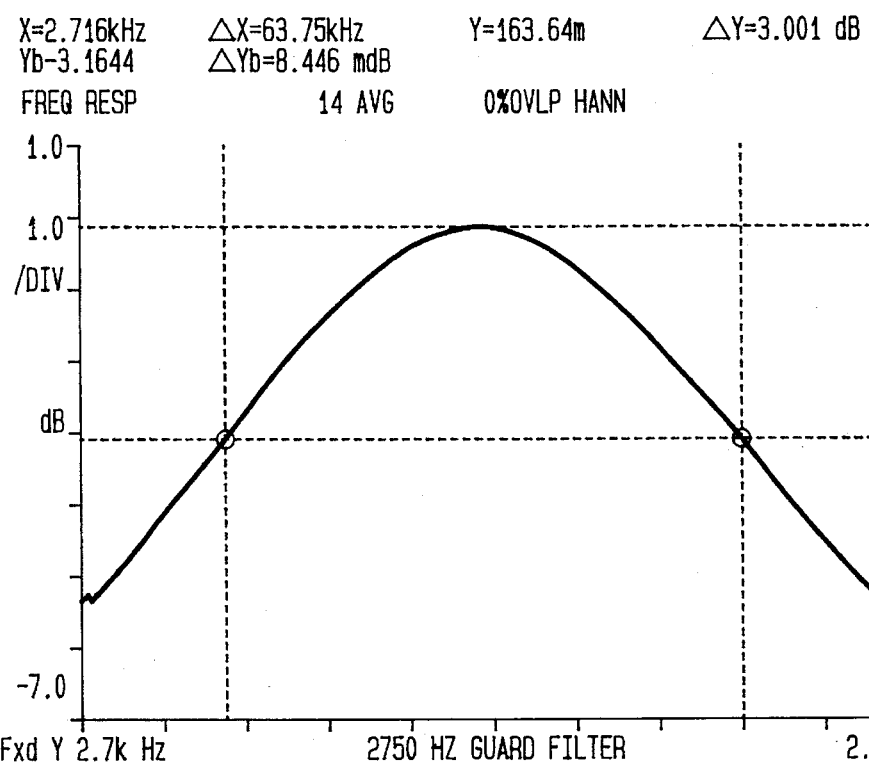
FIG. 6B is an enlarged portion of the graph of FIG. 6A.
Figure 7A:
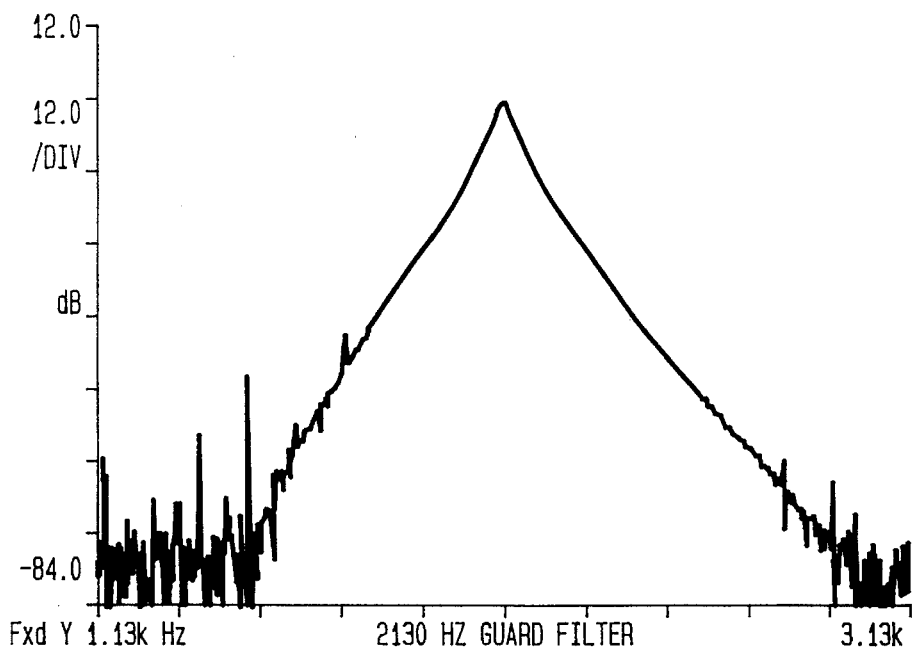
FIG. 7A is a graph illustrating the filter characteristics of a 2130 Hz guard filter.
Figure 7B:
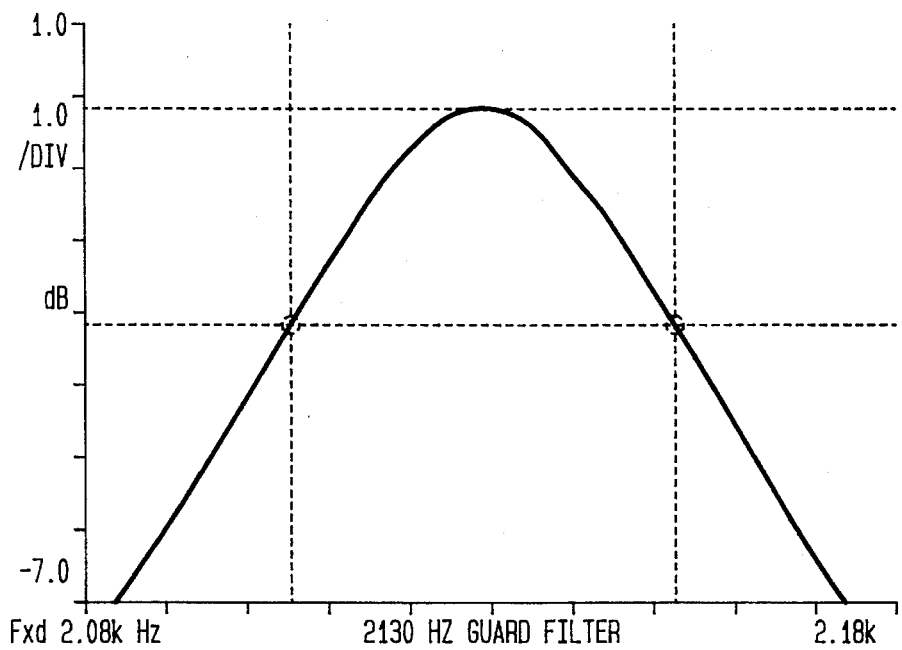
FIG. 7B is an enlarged portion of the graph of FIG. 7A.

A schematic block diagram of a circuit that utilizes the weighted guard tone signal detector principles, described hereinabove, to detect CAS signals for CIDCW is shown in FIG. 5. The parameters of the CAS signal for CIDCW are:

Tone signal type: Dual Tone

Frequency 1: 2130 Hz±0.5%

Frequency 2: 2750 Hz±0.5%

Duration: 80–85 ms

Received Level: −14—32 dBm

The guard bands were chosen around each of the signaling frequencies and the basic weighting function was essentially a butterworth filter tuned according to the aforementioned process. The target talkoff performance at an average near end party pre-emphasized speech level of −19 dBm was 1 talkoff in 25 hours. The target talkdown performance at an average tone level of −22 dBm per tone was 1 talkdown in 100 attempts.

The implementation of the circuit in FIG. 5 utilizes a concept known as limiter-guard action to efficiently implement the block diagram of the weighted guard tone signal detector of FIG. 4. The circuit 50 consists of two independent channels, one for each signaling frequency. The first channel 52 is tuned to 2750 Hz and the second channel 54 is tuned to 2130 Hz. Each of the channels 52 and 54 includes a guard filter 56, a gated instantaneous limiter 58, a post-limiter filter 60 and threshold detection circuits 68 and 70. The output of each channel is made available to the timing section 72 for analysis. The ANDing function previously depicted is implemented in the timing algorithm rather than in hardware to enable channel delay compensation.

The guard filters 56 are each centered on one of the CAS frequencies and their experimentally tuned filter characteristics are shown in FIGS. 6A, 6B, 7A and 7B. Their purpose is three-fold. First, the guard filters 56 must band separate an incoming signal so that no element of the 2130 Hz component will affect the detection of the 2750 Hz component and vice versa. Second, the guard filters 56 must allow the CAS signaling frequency to pass without attenuation. In some cases, the guard filter may provide gain to one of the frequencies to help equalize the uneven loss incurred over the transmission channel. The third function of the guard filters 56 is to weight the guard band which was selected around the signaling frequency. In this implementation, instead of providing a separate weighted guard energy signal, the weighted guard energy and signaling tone energy are combined and presented to the limiter 58. The limiter 58, post-limiter filter 60 and threshold detection circuit 70 perform the function of the complex comparator 35 in FIG. 4.

In order to describe limiter-guard action and to make clear how the weighted guard detector concepts are implemented, it is best to first describe the simple situation where a valid CAS is incident upon the detector without interference. The signaling tones of the CAS are first band separated by the guard filters 56 with the output of the guard filter 56 being a single sine wave at either 2130 or 2750 Hz. The output sine wave is incident upon the gated-limiter 58 which converts the signal at its input to a fixed amplitude of A for positive valued signal voltages and −A for negative valued signal voltages. The resulting waveform is ideally a symmetrical square wave whose period matches that of the input sine wave. Each gated-limiter 58 is gated by a gating circuit generally indicated by 62. Each gating circuit 62 includes an AC-RMS converter 64 and a threshold detector 66. The gated-limiter 58 prevents noise, speech or crosstalk below a preset threshold (−32 dBm) from activating the limiter and potentially causing a talkoff. The square wave emerging from limiter 58 is passed through a post-limiter filter 40 tuned to one of the desired signaling frequencies. The function of post-limiter filter 40 is to extract the signaling frequency component from the limited signal. As a periodic signal, the square wave can be broken down into its Fourier series elements, consisting of a fundamental sinusoid and an infinite number of odd harmonics with amplitude $4A/(\pi*(2n+1))$, where n=0 represents the fundamental frequency. Note that the amplitude of the fundamental sine wave extracted by post-limiter filter 40 has an amplitude 2.1 dB greater than the square wave that produced it.

A high Quality factor filter (high Q filter) is preferred over the traditional low Q design. The high Q filter provides two distinct advantages that include:

steep rolloff that facilitates quick and discrete frequency rejection; and the ability to limit the frequency acceptance range to the signal frequency tolerance for systems using very narrow signaling tolerances.

Figure 8A:
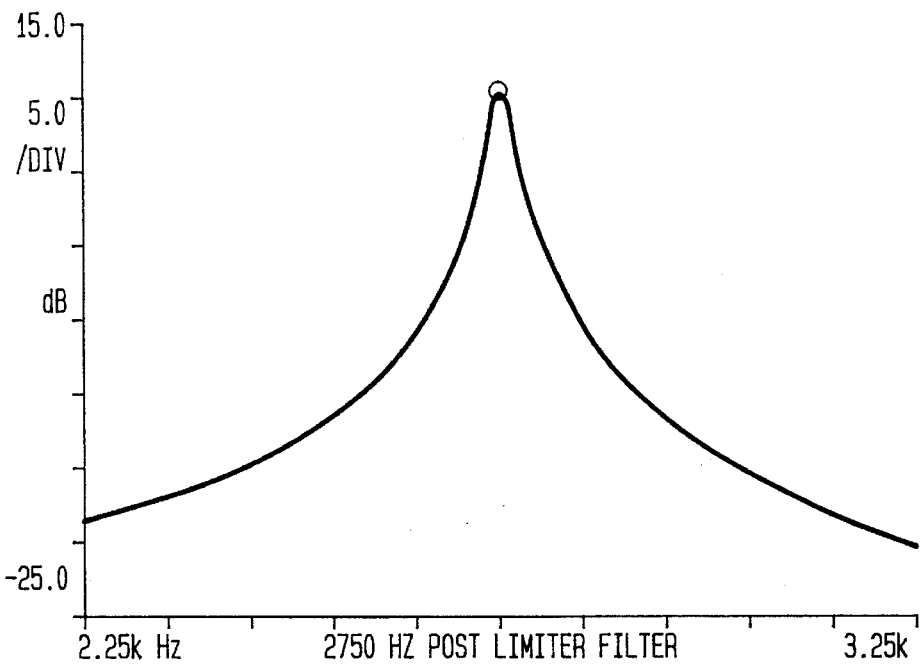
FIG. 8A is a graph illustrating the filter characteristics of a 2750 Hz post-limiter filter.
Figure 8B:
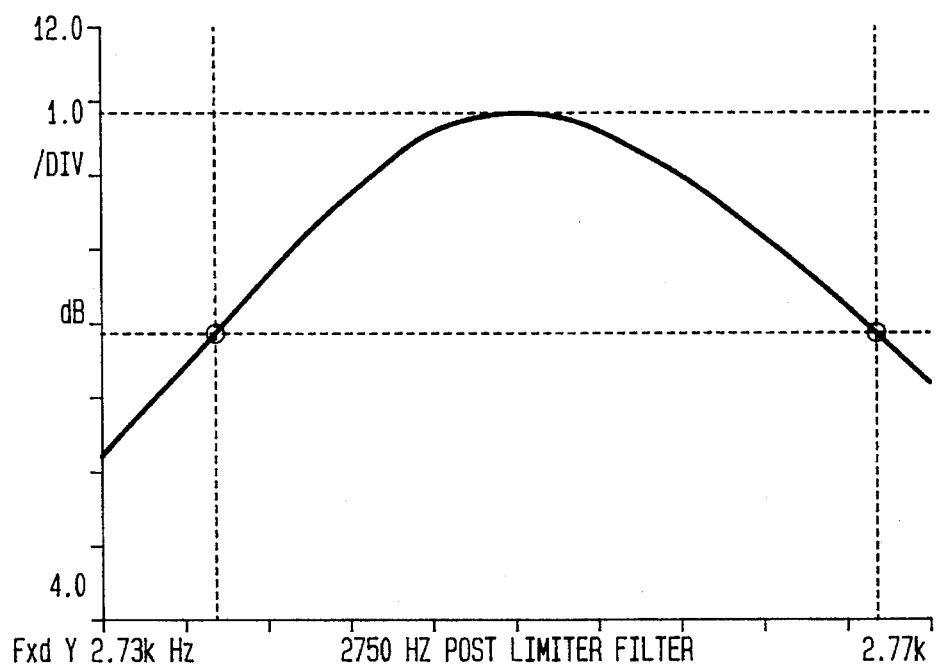
FIG. 8B is an enlarged portion of the graph of FIG. 8A.
Figure 9A:
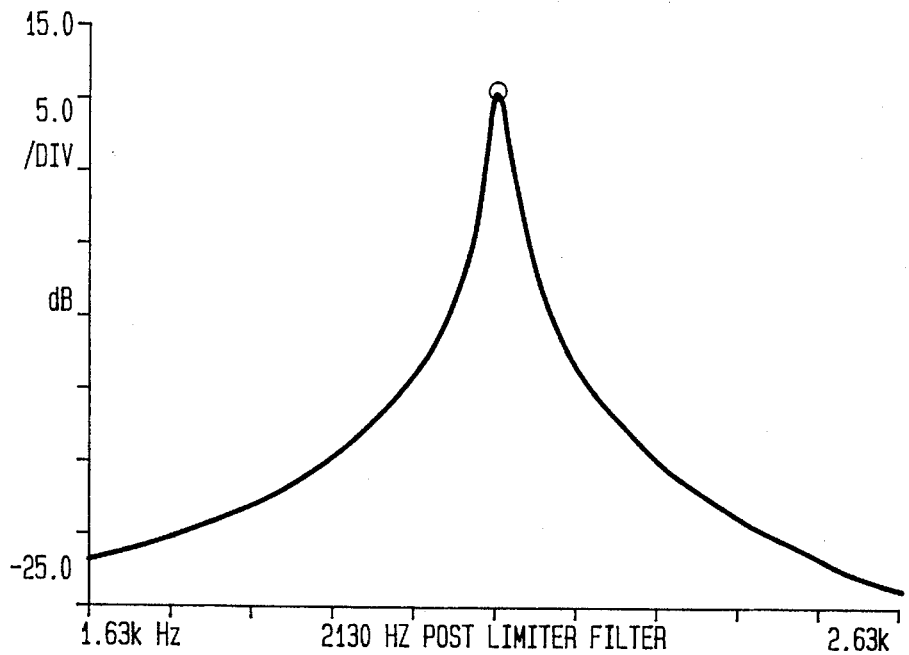
FIG. 9A is a graph illustrating the filter characteristics of a 2130 Hz post-limiter filter.
Figure 9B:
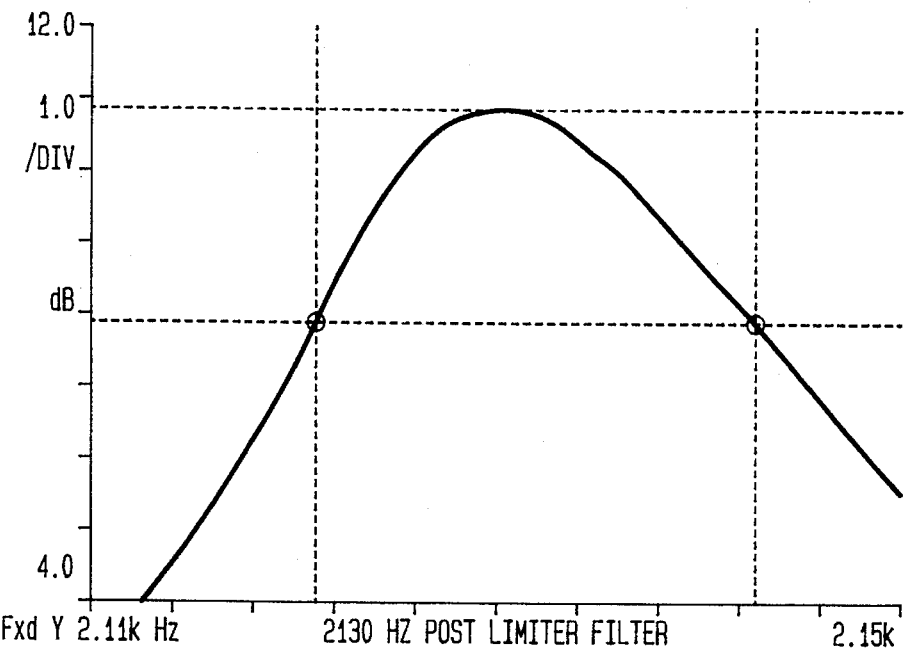
FIG. 9B is an enlarged portion of the graph of FIG. 9A.

FIGS. 8A and 8B show the filter characteristics of the post-limiter filter 60 for the 2750 Hz channel 22, and FIGS. 9A and 9B show the filter characteristics of the post-limiter filter 60 for the 2130 Hz channel 24.

The recovered sine wave emerging from each post-limiter filter 60 is then rectified by an AC-RMS converter 68 or simple integrator, and the threshold detector 70 indicates a logic 1 if the RMS value of the sine wave exceeds the preset threshold. The threshold detector circuit 70 is adjusted so that a CAS with signaling tones at the tolerances will still produce a logic 1 therefrom. In the preferred implementation, the post-limiter threshold level is set at approximately ±0.5% of the signaling frequencies or 6 dB below $4A/(\pi*(2n\pm 1))$ volts. The outputs, C1 and C2, of both threshold detectors 70 enter a timing device or section, generally indicated at 72.

Now, consider the case when a CAS is incident upon the detector with speech interference. The guard filters 56 again band separate the CAS but this time they also pass the weighted guard signal derived from the interfering speech. The output of each guard filter 56 contains the summation of one signaling tone and the weighted guard signal. In terms of waveform, this signal look somewhat similar to a sine wave since each guard filters is relatively narrow, but exhibits frequency jitter. The gated-limiter 56 converts this signal into a square wave that is not symmetrical and seems to have some frequency modulation causing the period to expand and contract. Fourier analysis of this waveform still reveals the presence of the signaling tone. However, it is now at a much reduced level as compared to the previous case.

It is the characteristic of extreme limiters to accentuate the differences in level between frequencies at its input. The frequency or signal with highest amplitude at the input to the limiter is said to have captured the limiter because the output waveform tracks this signal. Typically, this should be the signaling tone. When two or more frequencies of different amplitudes are incident upon limiter 58 as might happen in the case of a talkoff, the amplitude of the fundamental sinusoid of the resultant square wave will rapidly drop. In other words, as more guard energy is present at the input to limiter 58, the amplitude of the signal extracted by post-limiter filter 60 decreases from its peak value of $4A/\pi$ for a valid tone because the guard energy is altering the position of the zero crossings. If sufficient interference exists to alter the zero crossing significantly, the extracted signal will fall below the threshold and the threshold detector 70 will output a logic 0. This is the concept of limiter-guard action. The guard filters allow the weighting guard signal to interfere with energy in speech at the signaling frequency to prevent it from talking off the detector.

The threshold detector 70, in this case, is set to accept any post-limiter filter signal whose amplitude is not more than 3 dB below the peak value of $4A/\pi$. Through experimentation and simulation, it was determined that a 3 dB drop in the post-limiter filter signal level occurs when the signal-to-guard ratio at the input to limiter 58 is 0 dB. Thus, for positive signal-to-guard ratios at the input to limiter 58, the extracted signal will fall above the threshold and threshold detector 70 will output a logic 1. For negative signal-to-guard ratios, the extracted signal will fall below the threshold and threshold detector 70 will output a logic 0. Functionally, the circuit in FIG. 5 thus implements the block diagram of the weighted guard tone signal detectors in FIG. 4.

Figure 10A:
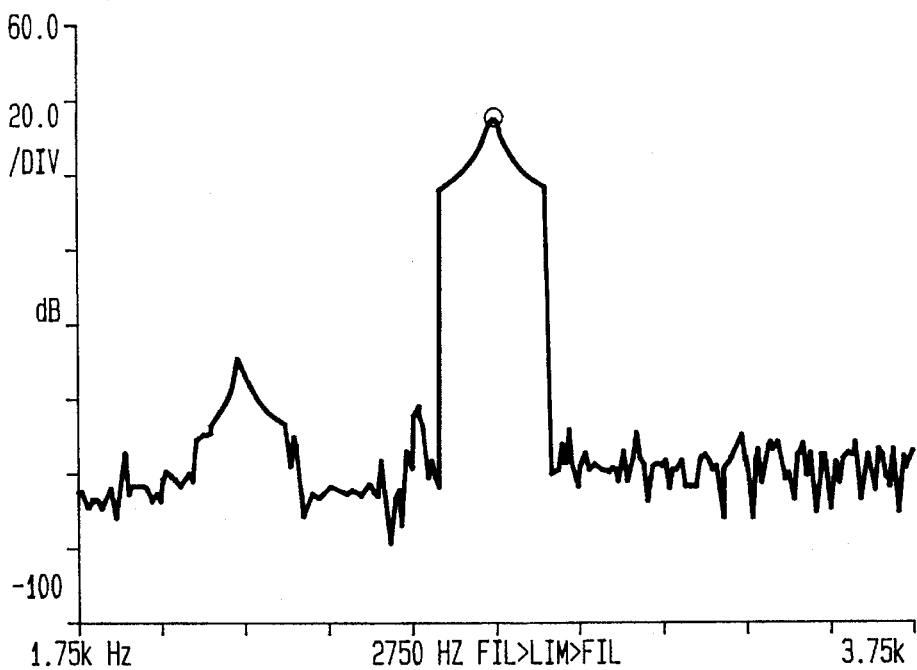
FIG. 10A is a graph illustrating the channel response of the 2750 Hz channel.
Figure 10B:
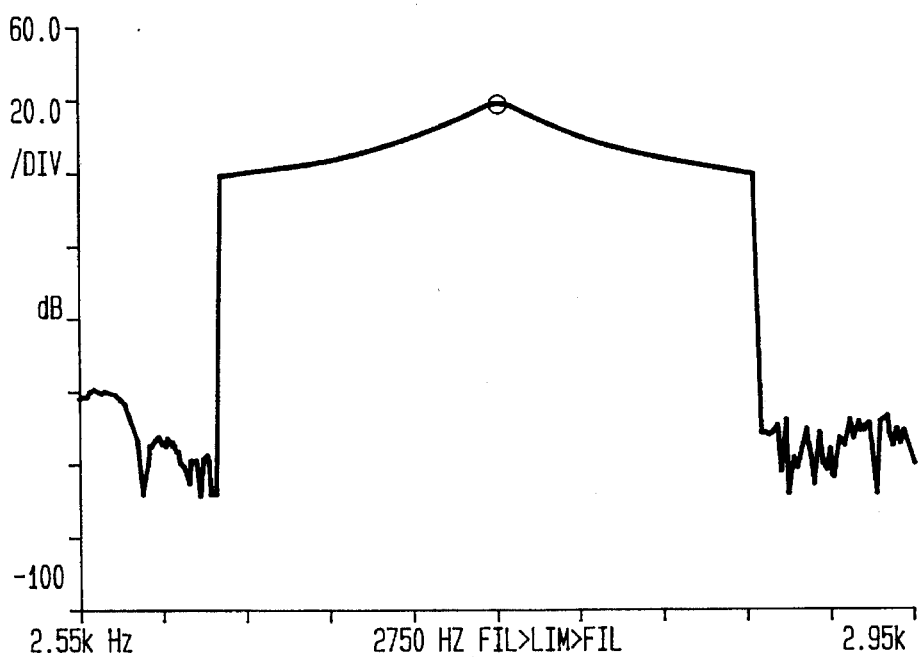
FIG. 10B is an enlarged portion of the graph of FIG. 10A.
Figure 11A:
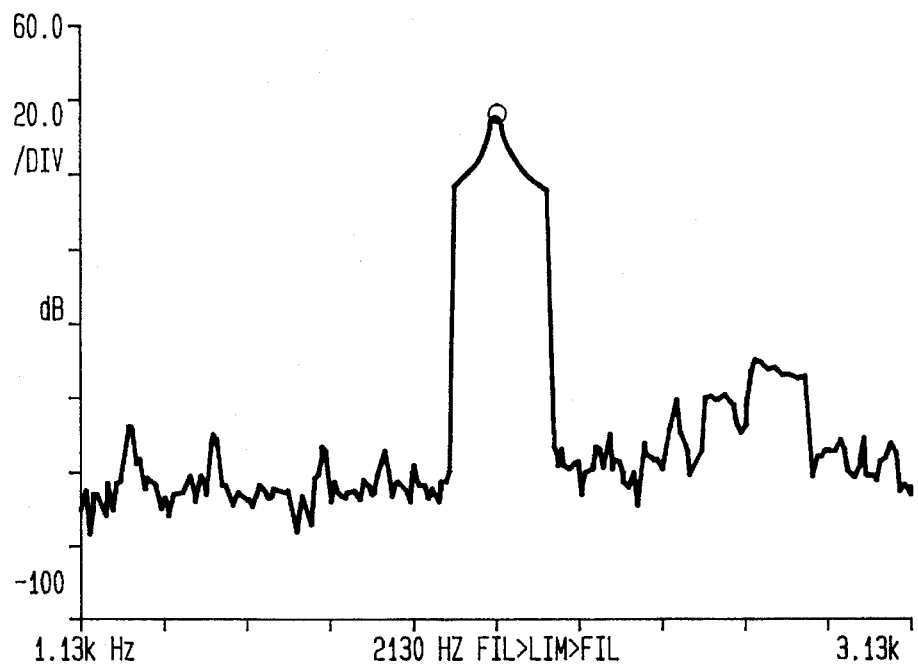
FIG. 11A is a graph illustrating the channel response of the 2130 Hz channel.
Figure 11B:
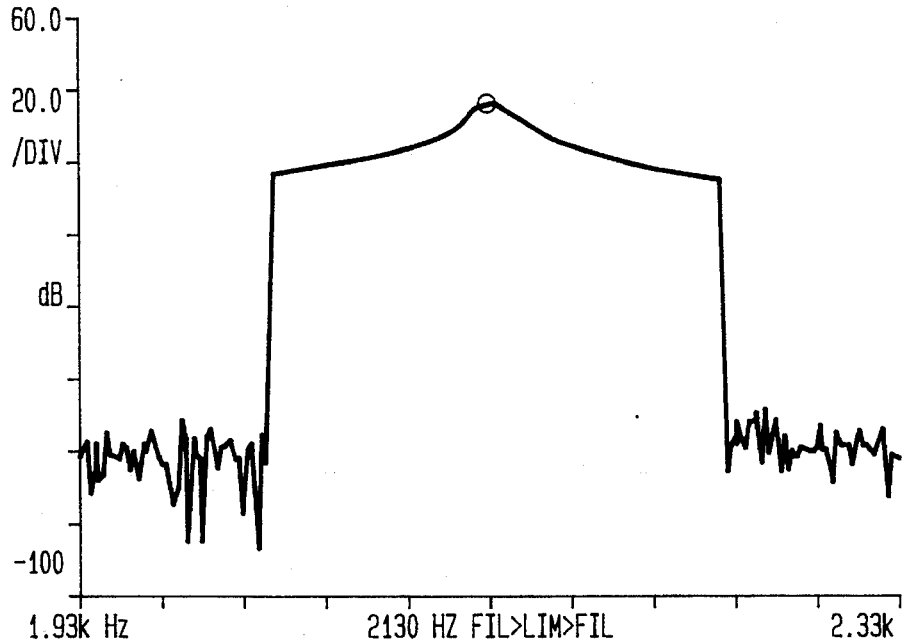
FIG. 11B is an enlarged portion of the graph of FIG. 11A.

The combination of guard filter 56, gated-limiter 58, post-limiter filter 60 and the threshold detectors 68 and 70 create a unique channel response as illustrated in FIGS. 10A and 10B for the 2750 Hz channel 52 and FIGS. 11A and 11B for the 2130 Hz channel 54. The channel responses depicted in these FIGS. seem to simulate a very narrow filter with extremely steep sides. However, because of the effect of limiter-guard action, this combination of circuits tuned to specific values implements the weighted guard principles and is responsible for the talkoff and talkdown performance of the detector.

Figure 12:
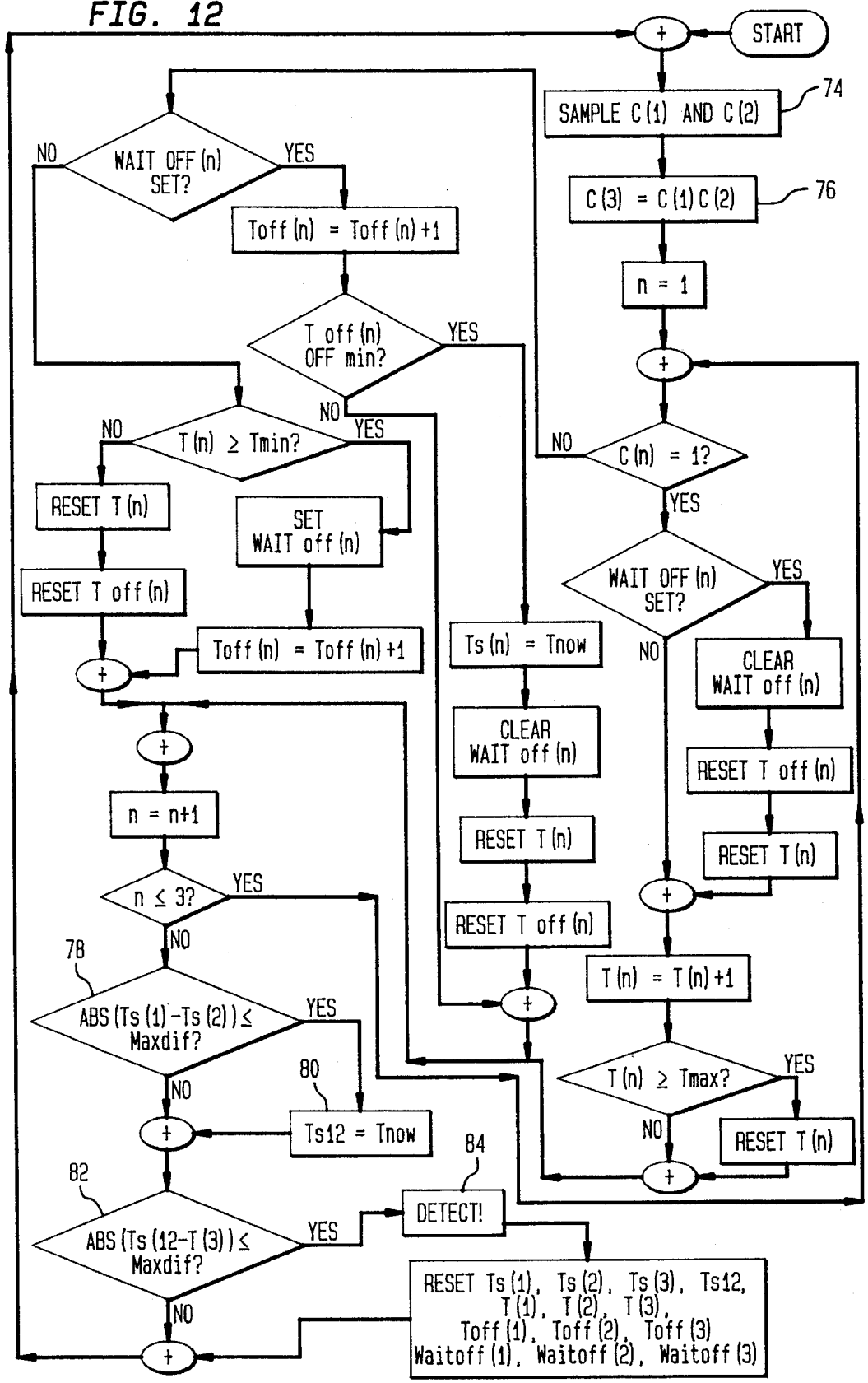
FIG. 12 is a block diagram flow chart illustrating a first timing algorithm used in conjunction with the present invention.

FIG. 12 is a flowchart of the first timing algorithm. In general, the first timing algorithm imposes various restrictions on the maximum and minimum signal length. The parameters in the flowchart are as follows:

Ts(n): Timestamp for channel n

C(n): Channel n output (equal to Cn for n=1 and 2)

T(n): On time timer

Toff(n): Off time timer

Waitoff(n): Begin off time timing flag

TS12: Timestamp for channel 1 & 2

Tnow: Current time

At block 74 in the first timing algorithm, the output, C1 and C2 (C(1) and C(2), respectively, in the flowchart), of each channel is timed separately for a valid single frequency detection. At block 76, a third channel, C(3), is derived by taking the logical AND of the C1 and C2 outputs of channels 52 and 54. At block 78, if channel 52 and channel 54 detect a valid signal within a specified time (Maxdif) of each other, then a time stamp (TS12) is recorded as indicated at block 80. At block 82, TS12 is compared with the time stamp for channel 3 (TS(3)). If they occur within Maxdif of each other, a valid signal detection has occurred as indicated at block 84. This algorithm ensures that the two frequencies occur coincidentally for the proper length of time as well as ensuring the coincidence was not created by two longer false detections on channels 52 and 54, where the coincidence of these signals was equal to the proper signal length as specified.

The second algorithm, also referred to as a Speaker-Level-Loss Loss (SLL) adaptive timing algorithm, also times a single binary stream formed by logically ANDing the C1 and C2 outputs of both threshold detectors 70. A logic 1 in the binary stream indicates the coincidence of both signaling frequencies in time. FIGS. 13A through 13H contain the flowchart of the SLL adaptive timing algorithm.

The SLL adaptive timing algorithm has two novel concepts that distinguish it from prior art timing algorithms. The first is the ability to adaptively adjust the program parameters used for alerting signal determination based upon the characteristics of signals received in the past. The characteristics of signals determined to be legitimate alerting signals and those that could potentially be alerting signals are recorded in a buffer known as the received signal cache. Once the cache fills up, the SLL algorithm extracts some minimum and maximum signal characteristic limits and updates the program parameters. The process repeats each time the received signal cache reaches it limit. The second novel concept in the SLL algorithm is the ability to recognize and discount repetitive talkoff signals. In CIDCW, talkoff signals can be positively identified by the absence of data after sending back the acknowledgment signal. Once a talkoff occurs, the characteristics of the signal are stored in a buffer known as the talkoff signal cache. As long as the talkoff signal cache has at least one entry, each subsequent potential alerting signal is screened against this list for the purposes of identifying duplicate talkoff signals. Duplicate talkoffs are rejected and new talkoffs are added to the list adaptively adjusting program parameters based upon the received signal characteristics and actively screening all potential alerting signals for talkoff signals tailors the alerting signal detector to the signaling environment and improves talkoff and talkdown performance.

The SLL adaptive timing algorithm has twelve basic steps. These include (1) deriving from the comparison signals C1 and C2, as noted above, a single logic pulse signal known as the composite signal; (2) timing the length of each composite signal pulse; (3) assigning a figure of merit, known as the score, to each composite signal pulse occurring within some predetermined window of time, known as an active signal window, after a legitimate alerting signal was believed to have started; (4) totaling the score of all pulse activity within the active signal window; (5) determining whether the total score and the length of the first pulse in the active signal window are within some absolute and adaptive ranges; (6) rejecting those signals outside of the both ranges; (7) updating the received signal cache with the total score and first pulse length for those signals within the absolute range but outside of the adaptive range; (8) checking whether the total score and first pulse length of those signals inside of both ranges are representative of a previously known talkoff signal; (9) designating these signals as either alerting signals or talkoff signals; (10) recording their total score and first pulse length in the received signal or talkoff signal cache based on whether or not the incoming signal was a legitimate alerting signal; and (12) updating the adaptive program parameters according to the minimum and maximum total scores and first pulse lengths in the received signal cache.

The SLL adaptive timing algorithm is based upon the following premises:

The alerting signal detector will be used in an environment where the majority of speech energy is produced by a small number of sources.

The probability of a talkoff of duration xms is three times greater than the probability of a talkoff of duration 2xms.

The large majority of talkoffs produced by a particular speaker or small group of speakers are caused by the pronunciation of a specific word, vowel, consonant or collection thereof. These talkoffs can be identified by a composite signal signature that is almost unique.

The composite signal signature for valid single burst alerting signals may contain more than one pulse. The composite signal signature for multiple burst alerting signals will contain more than one pulse.

Feedback about those signals judged to be alerting signals is available to indicate whether or not the detection decision was correct.

The expected range of composite signal characteristics can be defined by absolute maximum and minimum program parameters.

Figure 13A:
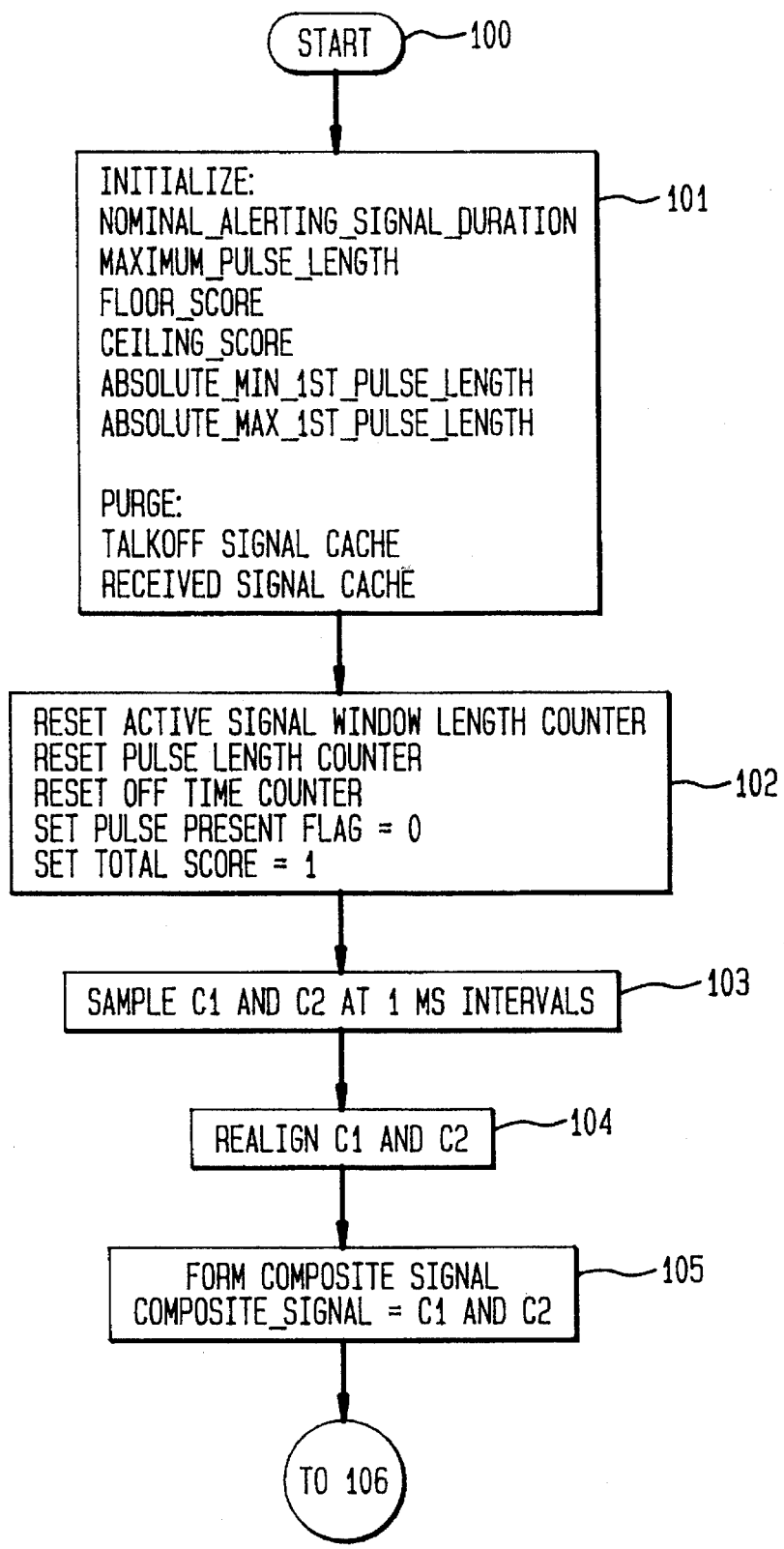
FIGS. 13A–13H are block diagram flow charts illustrating a second or adaptive timing algorithm used in conjunction with the present invention.
Figure 13B:
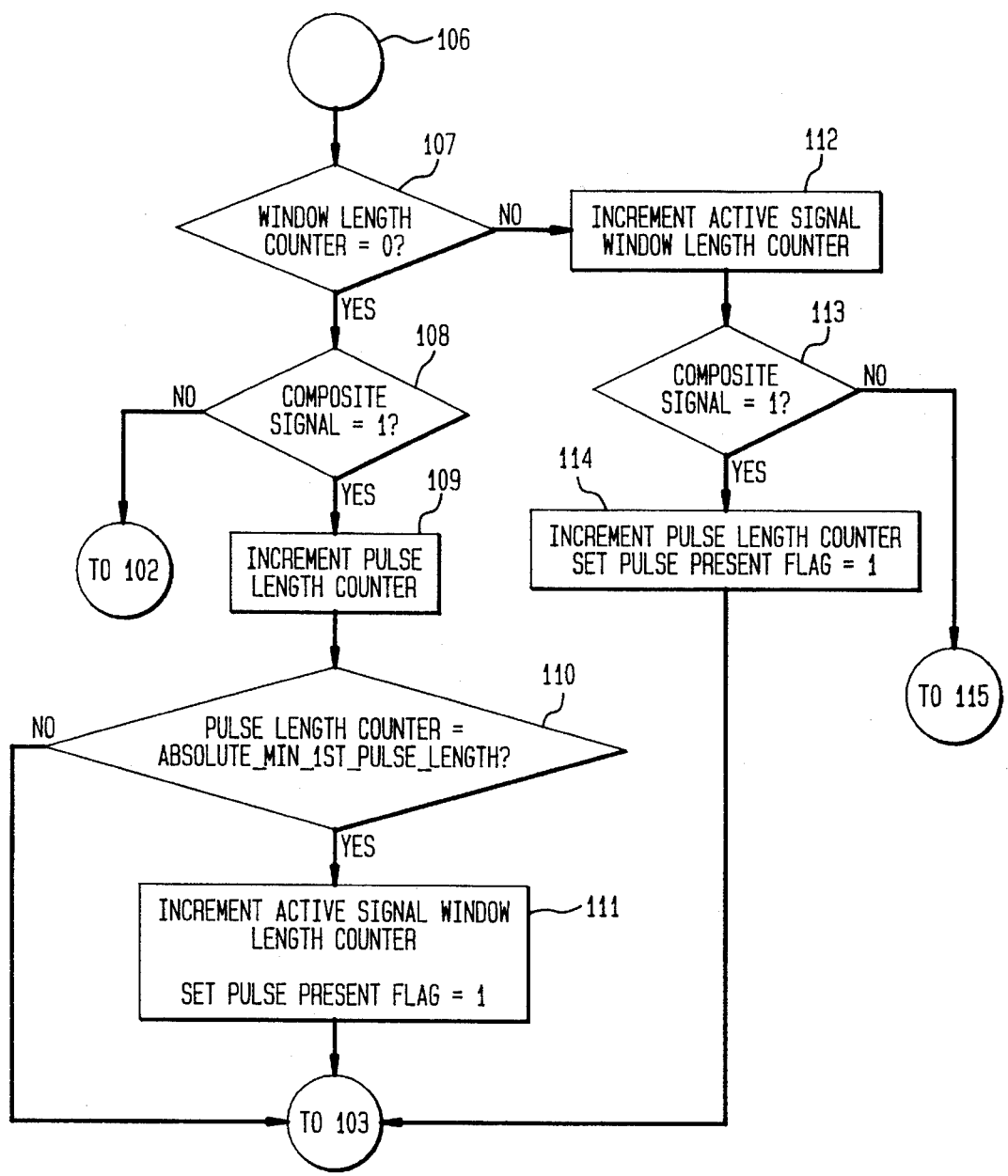

The SLL algorithm takes the comparison signal from each channel as input. In FIG. 13A, after initializing the parameters at block 101 after the start of the algorithm at block 100, the algorithm samples each comparison signal at regular intervals as indicated at block 103. Because the delay from channel to channel can vary due to differences in the filtering operations previously discussed, the comparison signals can be skewed in time. The SLL algorithm uses simple shift registers at block 104 to realign the comparison signals and then proceeds to logically AND all comparison signals at block 105 to from a single binary data stream called the composite signal.

Each signal incident upon the alerting signal detector produces a nearly unique pulse pattern on the composite signal. This pattern, known as a composite signal signature, may contain one or more pulses or sequence of pulses. Since the composite signal is the logical AND of the realigned comparison signals, a logic 1 in the composite signal data stream indicates the coincidence of signaling frequency energy on each channel. The pulse pattern of the composite signal signature indicates the coincidence of signaling frequency energy as a function of time.

The number and length of pulses in the composite signal signature for legitimate alerting signals are a function of the characteristics of the alerting signal generator, the transmission channel between the generator and alerting signal detector, and all speech energy incident upon the alerting signal detector. Low alerting signal generator levels, high transmission channel losses and high volume incident speech energy favor multi-pulse composite signal signatures. Conversely, high alerting signal generator levels, low transmission channel losses and low volume incident speech energy favor single pulse composite signal signatures. For talkoff signals, the characteristics of the composite signal signature are solely a function of the incident speech energy.

Talkoff composite signal signatures can have any number of pulses.

While the composite signal is at a logic 0, the SLL algorithm simply loops through the sequence of blocks 102, 103, 104, 105, 106, 107 and 108 (the latter three blocks in FIG. 13B) and awaits the leading edge of a composite signal pulse. When the composite signal goes high, the SLL algorithm begins timing the width of the incoming pulse by incrementing the pulse length counter as indicated at block 109 in FIG. 13B. Since speech and noise can produce short spurious pulses, every pulse in the composite signal does not indicate the presence or start of a legitimate alerting signal. As a way of screening out these signals from legitimate alerting signals, a minimum pulse width is required before the algorithm begins to evaluate the incoming signal. The composite signal must remain at a logic 1 for a duration at least equal to ABSOLUTE_MIN_1ST_PULSE_LENGTH as indicated at block 110 before the SLL algorithm assumes a legitimate alerting signal may be in progress. Otherwise, the pulse length counter is reset and the SLL algorithm is idled, awaiting the next logic 1 transition. The recommended value for ABSOLUTE_MIN_1ST_PULSE_LENGTH is one half of the nominal alerting signal duration, hereby referred to as NOMINAL_ALERTING_SIGNAL_DURATION.

If the minimum pulse width criteria is satisfied, the SLL algorithm starts an active signal window at block 111. The active signal window defines the segment of time used to collect the composite signal signature. Its duration is timed by the active signal window length counter at blocks 111 and 112. The value ABSOLUTE_MIN_1ST_PULSE_LENGTH represents the absolute minimum pulse length needed to start an active signal window. Only the first pulse that initiates the active signal window must meet or exceed ABSOLUTE_MIN_1ST_PULSE_LENGTH. All other pulses in the active signal window can be of any duration.

In order to make clear the benefits of the signal determination method used in the SLL adaptive timing algorithm, it is useful to consider the signaling environment in CIDCW. In signaling environments similar to CIDCW, speech energy varies dramatically. Considering the normal telephone conversation, there is a portion of time when the near end talker is speaking, another portion of time when the far end talker is speaking, a portion of time when both near end and far end are silent, and finally a portion of time when both near end talker and far end talker are talking. If an alerting signal is sent during the silent interval or when the near end is silent, the composite signal signature will most likely contain a single pulse. This is because the alerting signal arrives at the detector uncorrupted by speech. However, if the alerting signal is sent when the near end talker is speaking, the composite signal signature will most likely contain a series of pulses because of the presence of guard energy. Alerting signal detectors that must work under these circumstances must have the ability to recognize various alerting signal composite signal signatures.

Because no one pulse pattern can describe the composite signal signatures for all legitimate alerting signals, a simple pulse pattern template approach for signal recognition is inadequate. Instead, the SLL algorithm uses a scoring technique to assign a value to each pulse in the composite signal signature. The total score of the composite signal signature is the sum of the individual scores of each pulse. If the total score fits within some predefined and adaptive ranges, the signature is judged to be that of an alerting signal provided that a match is not found in the talkoff signal cache.

The advantage of this scoring technique is that it reduces the pattern recognition problem down to a simple range check on the score. By allowing many different pulse patterns to have the same total score, alerting signals corrupted by speech can still be designated as alerting signals without tracking the exact position, duration and number of holes in the composite signal signature. The basic concept is to designate any pattern as an alerting signal as long as the total score requirements are met.

Once an active signal window is initiated, the SLL algorithm times and scores each pulse, starting with the first pulse that satisfies the minimum first pulse length criteria. Timing of each pulse in the composite signal signature occurs at block 114. The pulse present flag that is set at blocks 111 and 114 and reset at block 120 is used, in FIG. 13C, to indicate that a pulse needs to be scored when the composite signal returns to a logic 0 state at block 116.

Every time the composite signal reverts back to a logic 0 during the active signal window, the pulse length counter is reset at block 119 so that other pulses in the composite signal signature can be accurately timed. The length of the pulse is then compared to a preset maximum pulse length defined by the value MAXIMUM_PULSE_LENGTH as indicated at block 120. The maximum pulse length check at block 120 prevents unnecessarily long pulses, that would ultimately be rejected, from consuming processor time to calculate a score that will most likely produce an arithmetic overflow condition. If the pulse duration exceeds this limit, the program is idled.

Otherwise, the pulse is scored at block 123 based on its duration by the following equation:

$$\text{score} = 3^{[\frac{Pulse\ length}{10} - 1]} \quad (1)$$

and a cumulative total called the total score is maintained for all pulses in the active signal window.

The scoring equation describes a relationship where the score of a pulse increases by the factor of three for every 10 ms increase in pulse length. The base of three was selected because the occurrence of talkoffs decreases by a factor of three for every 10 ms increase in signal length. Table 1 provides some tabulated scores for various pulse lengths.

TABLE 1

| PULSE LENGTH | SCORE |
|---|---|
| 10 | 1 |
| 20 | 3 |
| 30 | 9 |
| 40 | 27 |
| 50 | 81 |
| 60 | 243 |
| 70 | 729 |
| 80 | 2187 |

The length of the first pulse in every active signal window is temporarily stored in a memory location called 1st_pulse_length as indicated at block 122. The determination of whether the current pulse was the first in the active signal window is based upon the value of the total score as indicated at block 121. The total score is only equal to 1 for the first pulse in the active signal window.

Figure 13C:
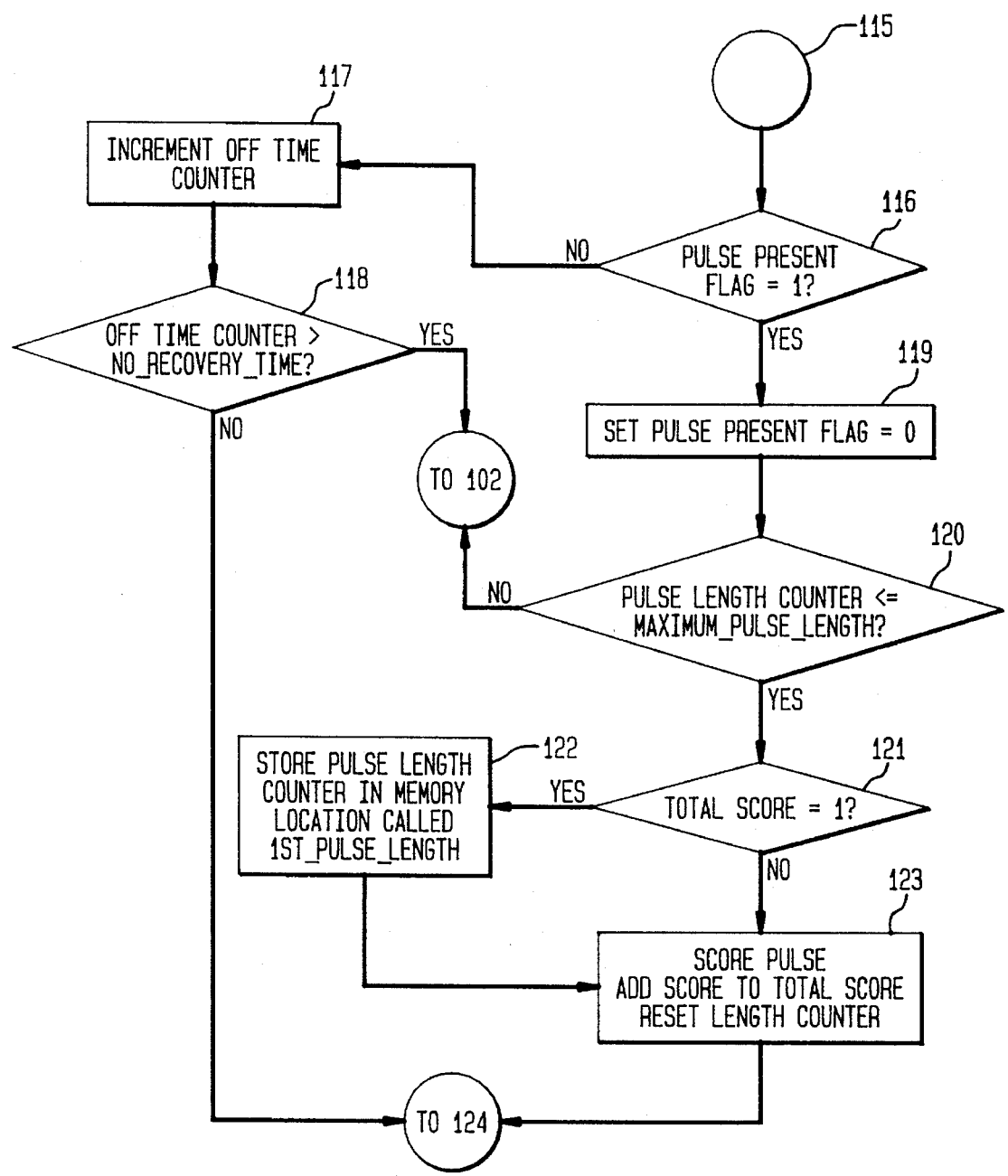
Figure 13D:
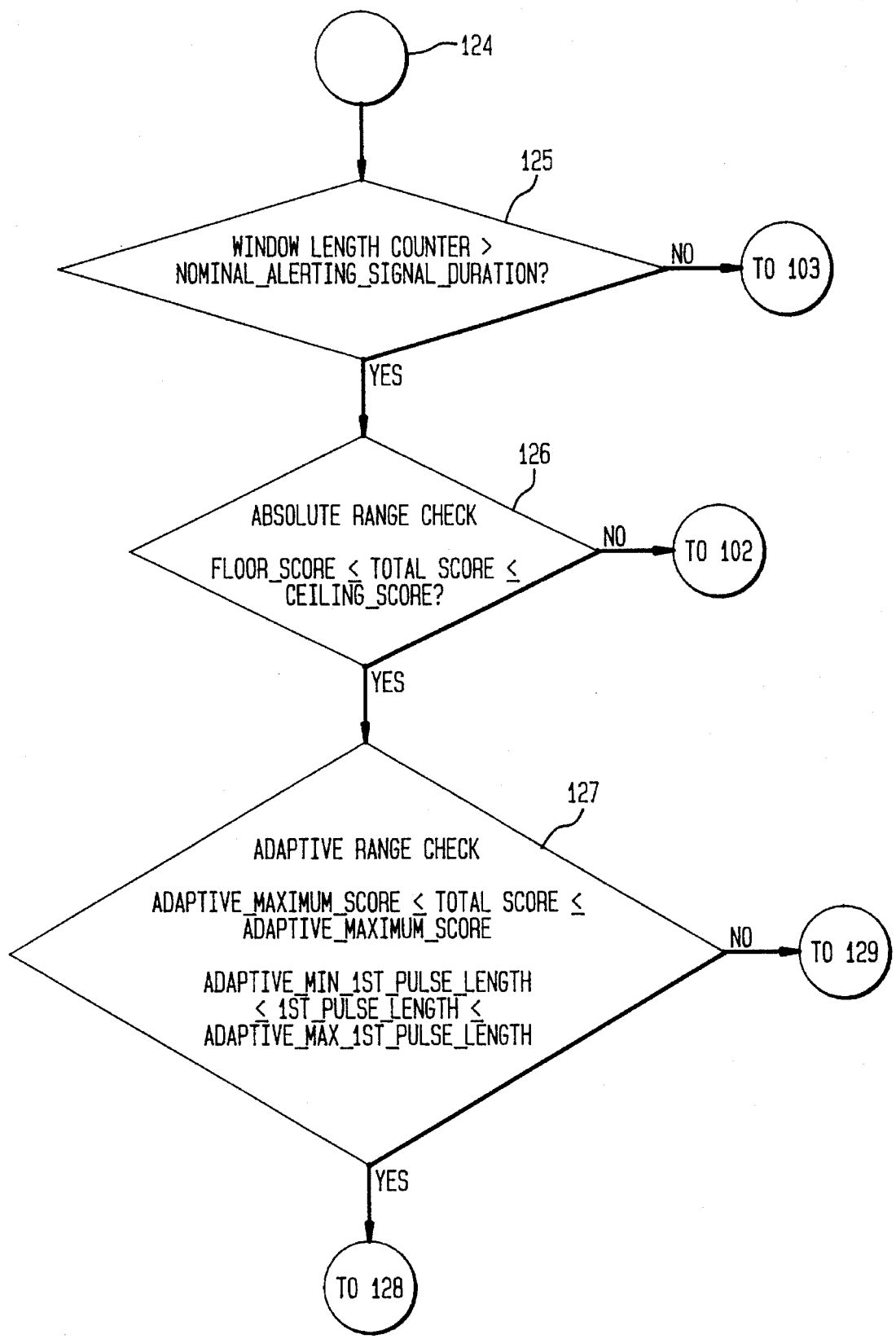
Figure 13E:
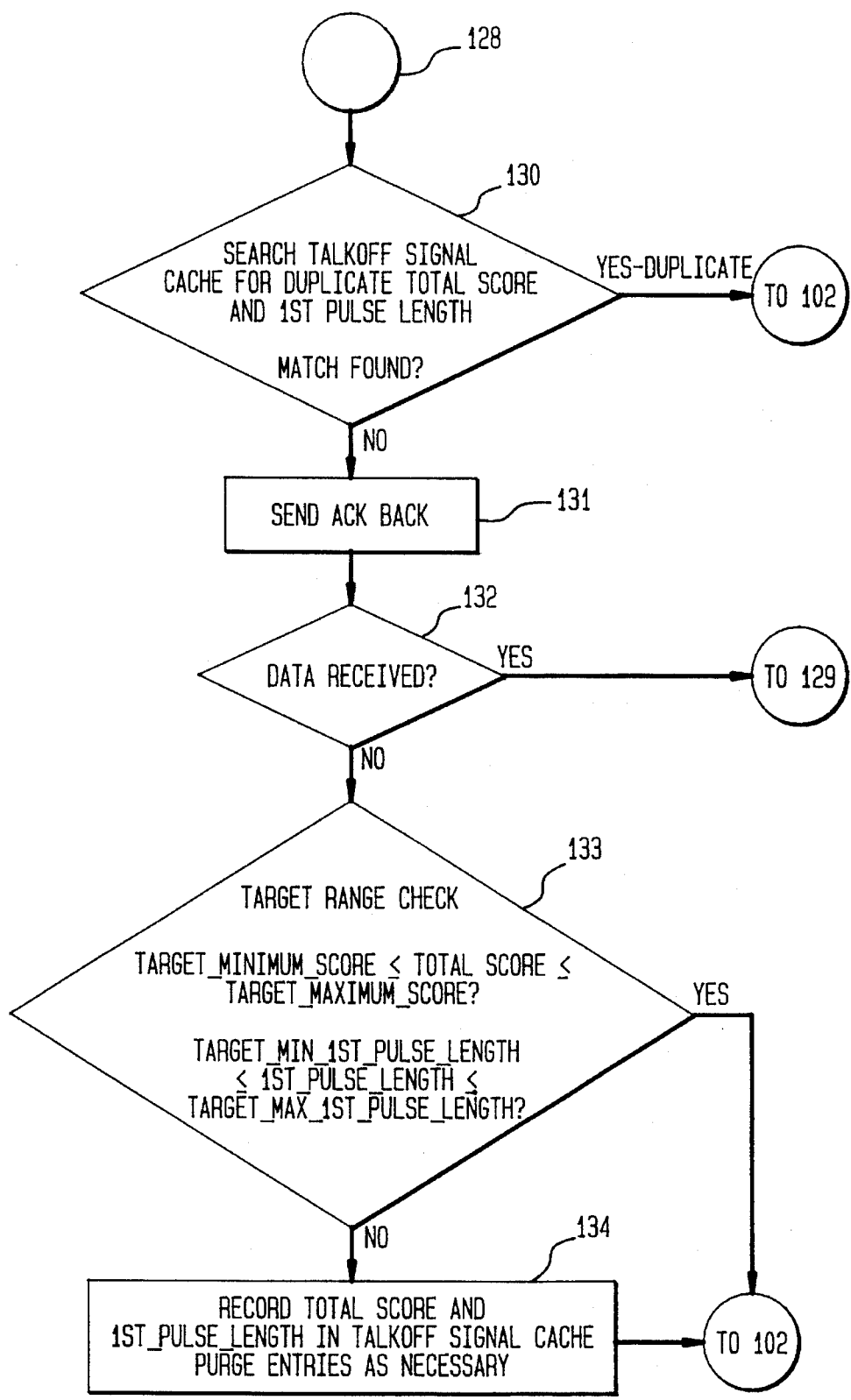

Once the pulse has been scored, the total score updated and the pulse length counter reset, the length of the active signal window is checked, in FIG. 13D, at block 125. If the active signal window length counter exceeds the NOMINAL_ALERTING_SIGNAL_DURATION at block 125, the SLL begins to evaluate whether the signal timed during the active signal window was an alerting signal. Otherwise, the algorithm continues to time and score each successive pulse in the window, but does not record their lengths.

The duration of the active signal window is nominally equal to the nominal length of a legitimate alerting signal. However, the active signal window can be extended if the composite signal is still at a logic 1 at the expiration of the active signal window timer. When this occurs, the SLL algorithm loops through the sequence of blocks 103, 104, 105, 106, 107, 112, 113, and 114, in FIGS. 13A and 13B. The active signal window continues as indicated until the composite signal reverts back to a logic 0 and is terminated at block 125 (in FIG. 13D).

Under certain circumstances, a legitimate alerting signal can get split between two active signal windows. This occurs when speech causes the composite signal to produce a spurious pulse that starts an active signal window just before the start of a legitimate alerting signal. The SLL algorithm will extend the active signal window as long as the composite signal remains high in an attempt to encompass the legitimate alerting signal. However, speech energy can cause the composite signal to revert to a logic 0 in the middle of the alerting signal, thus causing the active signal window to terminate. In these situations, it is unlikely that the alerting signal will be recognized because only part of it appears in each active signal window.

To reduce the possibility of having a legitimate alerting signal split over two active signal windows, the total time that the composite signal is at a logic 0 during an active signal window is monitored as indicated at blocks 117 and 118 (in FIG. 13C). If the off time counter exceeds the fixed value assigned to NO_RECOVERY_TIME, the program is idled. Idling the program before the expiration of the active signal window timer at block 118 will allow the next pulse on the composite signal to be treated as the potential start of a legitimate alerting signal.

The value NO_RECOVERY_TIME represents the amount of off time in an active signal window above which the total score can never meet the absolute minimum score checks further in the algorithm. This is because pulse durations are scored on a nonlinear basis where one long pulse will receive a greater score than two shorter pulses that together total the same length. The recommended value for NO_RECOVERY_TIME is:

$$\text{NO\_RECOVERY\_TIME} = \text{NOMINAL\_ALERTING\_SIGNAL\_DURATION} \quad (2)$$

$$-10 \times \left( \frac{\log(\text{FLOOR\_SCORE})}{\log (3)} + 1 \right)$$

Evaluation of the total score takes place at blocks 126 and 127 in FIG. 13D. Two checks on the total score and one on the first pulse length are performed. The first check on the total score is the absolute range check at block 126. The second is the adaptive range check at block 127. Also at block 127 is the check on the first pulse length.

The absolute range check requires that the total score to be greater than or equal to the fixed value FLOOR_SCORE and less than or equal to the fixed value CEILING_SCORE. In the event that it is not, the program is idled. The two values FLOOR_SCORE and CEILING_SCORE define a fixed range over which the SLL program is allowed to adapt and may accept alerting signals. The value FLOOR_SCORE represents the absolute minimum score that the SLL algorithm may accept for an alerting signal under the absolute worst signaling conditions. The value CEILING_SCORE represents the absolute maximum score the SLL algorithm may accept for an alerting signal. Fixed limits must be placed on this range otherwise the algorithm could adaptively wander off and accept scores that are either too low or too high.

The FLOOR_SCORE and CEILING_SCORE must be set based upon the expected duration of legitimate alerting signals. One obvious consideration is the signal duration tolerance of the alerting signal generator, hereby referred to as delta. For the sake of argument, delta represents the symmetrical variation in alerting signal duration. The FLOOR_SCORE and CEILING_SCORE must, at a minimum, encompass this tolerance. The FLOOR_SCORE must be less than the score of an alerting signal of nominal duration minus delta. Likewise, the CEILING_SCORE must be greater than the score of an alerting signal of nominal duration plus delta. However, this range is usually insufficient because the presence of speech energy will alter the received signal duration as measured on the composite signal. The CEILING_SCORE must be raised because speech energy will occasionally extend the apparent alerting signal duration. Since the probability of a talkoff decreases rapidly as its duration increases, accepting longer signals will not adversely affect talkoff performance and will most likely improve talkdown performance. It is recommended that the CEILING_SCORE be set using the score for an alerting signal of duration equal to 1.5 times the NOMINAL_ALERTING_SIGNAL_DURATION plus delta.

The FLOOR_SCORE must also be lowered because peaks in speech energy will occasionally cause a logic 0 on the composite signal during the presence of a legitimate alerting signal. The presence of speech energy may transform the single solid pulse expected on the composite signal for a legitimate alerting signal into a series of several pulses of various lengths. It is recommended that the FLOOR_SCORE be set using the score equal to twice that of an alerting signal with a duration equal to one half the NOMINAL_ALERTING_SIGNAL_DURATION plus delta.

If the total score is between FLOOR_SCORE and CEILING_SCORE at block 126, a more critical adaptive range check is performed at block 127. The adaptive range check requires the total score for alerting signals to be greater than or equal to the adaptive value adaptive_minimum_score and less than or equal to the adaptive value adaptive_maximum_score. The value adaptive_minimum_score represents the minimum score that a signal needs to achieve to be considered an alerting signal. Similarly, the value adaptive_maximum_score represents the maximum score that a signal can achieve and still be considered an alerting signal. Both of these values are adaptively adjusted based on the total scores stored in the received signal cache and are constrained to fall between FLOOR_SCORE and CEILING_SCORE. Also performed at block 127 is a check on the length of the first pulse in the active signal window to ensure that it is within the range specified by the adaptive values adaptive_min_1st_pulse_length and adaptive_max_1st_pulse_length.

Figure 14:
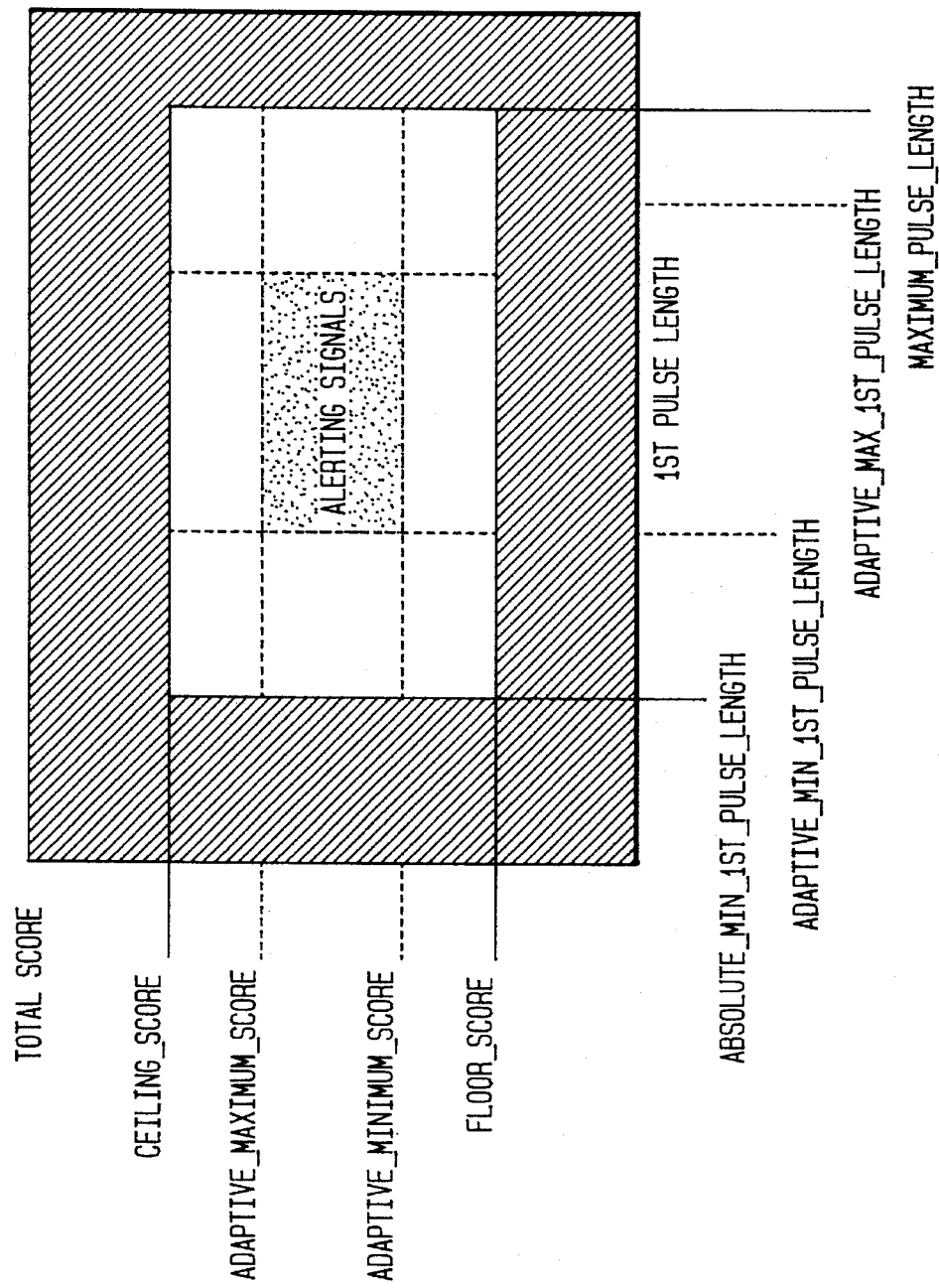
FIGS. 14 and 15 graphically show relationships between the parameters used in the adaptive timing algorithm.
Figure 15:
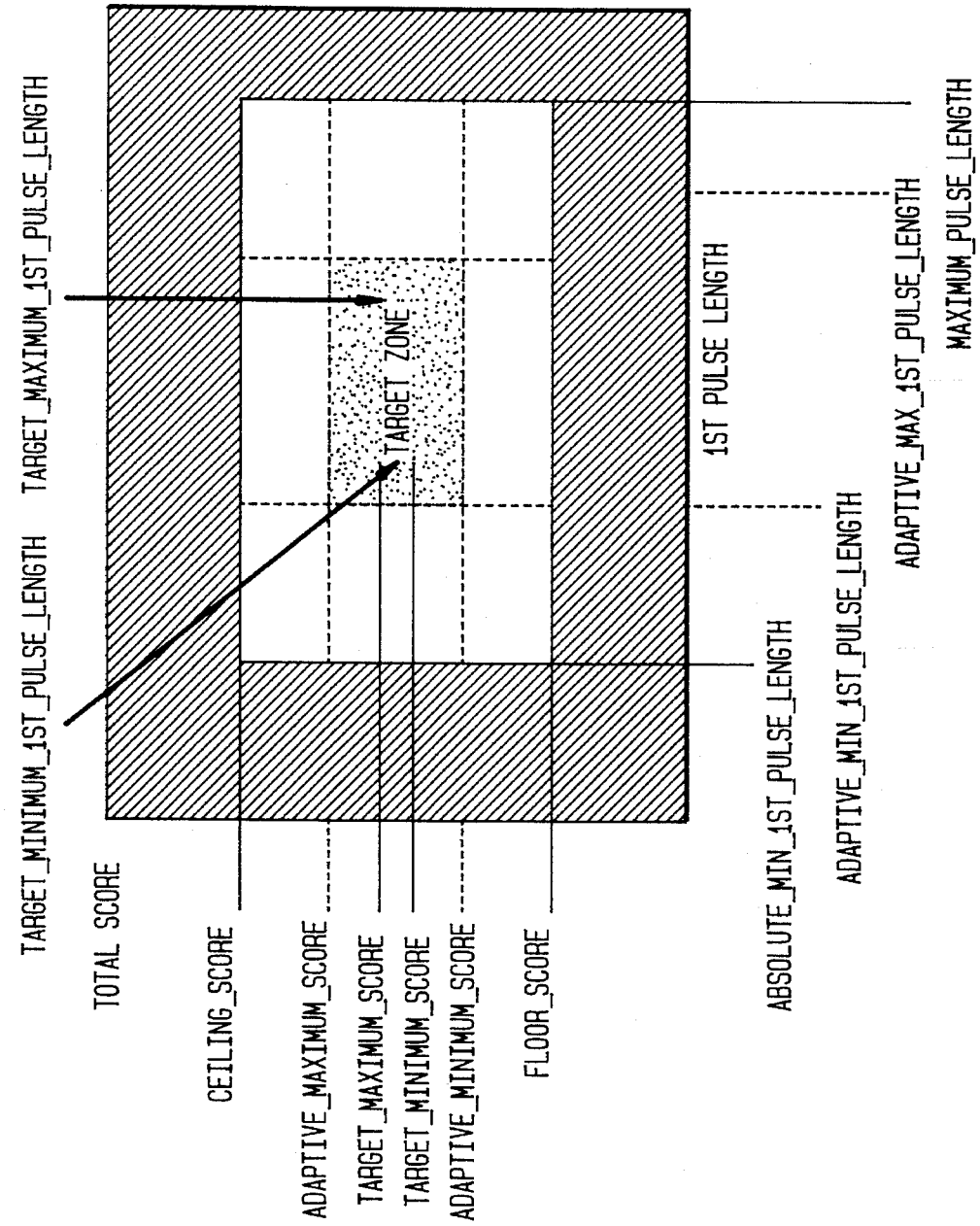

FIG. 14 illustrates how the fixed program parameters FLOOR_SCORE, CEILING_SCORE, ABSOLUTE_MIN_1ST_PULSE_LENGTH and MAXIMUM_PULSE_LENGTH define a region over which the adaptive program parameters, adaptive_minimum_score, adaptive_maximum_score, adaptive_min_1st_pulse_length, and adaptive_max_1st_pulse_length can adjust the alerting signal sample space. The length of the first pulse in the active signal window is plotted on the X axis and the total score of the composite signal signature on the Y axis. The space defined by adaptive_minimum_score, adaptive_maximum_score, adaptive_min_1st_pulse_length and adaptive_max_1st_ pulse_length represents signals judged to be alerting signals and for which acknowledgment signals will be sent back provided that no match is found in the talkoff signal cache. The size of this region is adaptively adjusted based upon the composite signal characteristics stored in the received signal cache and is allowed to expand up to the limits defined by FLOOR_SCORE, CEILING_SCORE, ABSOLUTE_MIN_1ST_PULSE_LENGTH and MAXIMUM_PULSE_LENGTH. Composite signals that fall in the region between the fixed and adaptive boundaries represent legitimate alerting signals talked down by speech and possibly some talkoffs.

If the total score is outside the adaptive range at block 127, the measured composite signal could be the signature of either a legitimate alerting signal talked down by speech or a talkoff signal. Because there is no feedback about detection decisions that do not classify incoming signals as alerting signals, we must assume the composite signal was a signature of a legitimate alerting signal and update the received signal cache with the total score and the length of the first pulse as indicated at block 135 in FIG. 13F.

It is possible that talkoff signals will be recorded in the received signal cache and that such information will be used to update the adaptive program parameters. In these situations, the updated parameters may alter the alerting signal space such that a talkoff signal could be designated as an alerting signal. However, if this does occur, it will only happen once for each unique talkoff signal since talkoff signals are recognized, recorded in the talkoff signal cache and used to identify future duplicate talkoffs. Talkoff performance does not suffer in the long run since the large majority of talkoffs produced by a particular speaker or small group of speakers are repetitive and readily identifiable.

On the other hand, if the total score satisfies the adaptive minimum and maximum checks and the first pulse length satisfies the adaptive minimum and maximum length checks at block 127, the composite signal signature appears to be that of a legitimate alerting signal. In this case, a final check on both the total score and first pulse length is initiated in the talkoff signal cache at block 130 in FIG. 13E. The talkoff signal cache is a circular buffer containing the total score and first pulse length for known talkoff signals. If a match of both total score and first pulse length is found, the composite signal is marked as a duplicate signal and the program is idled.

If the match is unsuccessful, the composite signal has passed all criteria and is judged to be an alerting signal. In the case of CIDCW, the acknowledgment signal (ACK) is sent back at block 131. If data follows, there is a positive confirmation that the algorithm correctly identified an alerting signal. The total score and first pulse length of the composite signal signature of this alerting signal are recorded in the received signal cache at block 135 (in FIG. 13F).

Otherwise, the lack of data indicates the algorithm accepted a talkoff signal. In this case, the total score and first pulse length will be added to the talkoff signal cache at block 134 (in FIG. 13E) upon one condition. Because some talkoff signals can imitate the composite signal signature of legitimate alerting signals, a small region in the alerting signal sample space, called the target zone, has been defined where legitimate alerting signals are highly likely to appear. If the total score and first pulse length of any talkoff composite signal signature fall within this target zone, they are not recorded in the talkoff cache as indicated at block 133. This prevents future legitimate alerting signals with characteristics similar to some talkoff signals from being marked as duplicate talkoff signals and rejected. Otherwise, the total score and first pulse length are added to the talkoff cache as indicated at block 134.

The target zone is defined by the fixed values TARGET_MINIMUM_SCORE, TARGET_MAXIMUM_SCORE, TARGET_MINIMUM_1ST_PULSE_LENGTH and TARGET_MAXIMUM_1ST_PULSE_LENGTH. This is illustrated in FIG. 14.

As composite signal signatures are collected and recorded, both the talkoff and received signal caches eventually reach their capacity. When the talkoff signal cache reaches it limit, records are discarded on the basis of a first-in last-out (FILO) method. When the received signal cache reaches its limit, the adaptive program parameters are updated and the cache is purged.

Figure 13F:
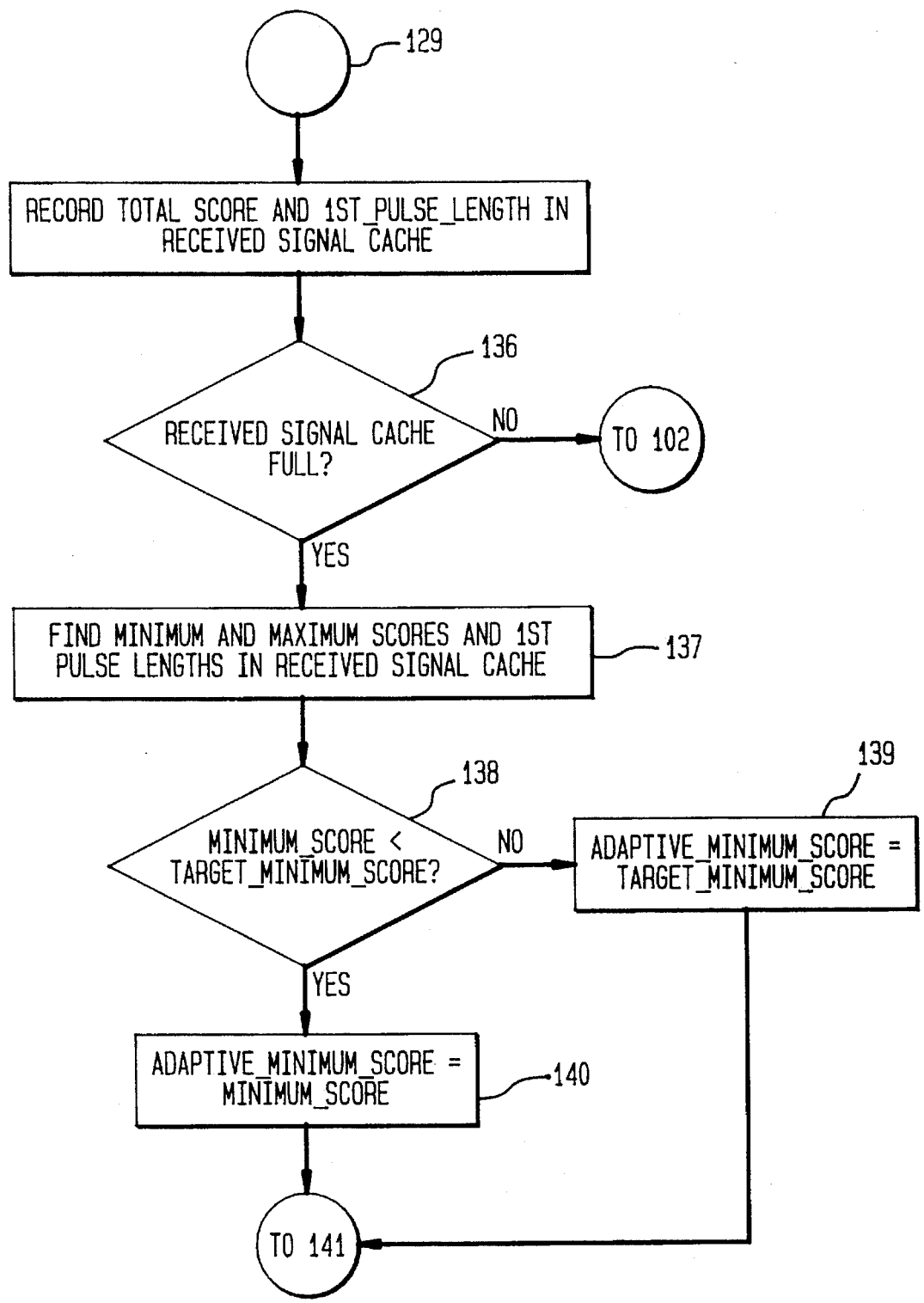

As indicated at block 137 in FIG. 13F, the maximum and minimum total scores and first pulse lengths are retrieved from the received signal cache. All three values can come from different entries in the cache. The maximum and minimum total scores and first pulse lengths are used to update the adaptive values adaptive_minimum_score, adaptive_minimum_score, adaptive_min_1st_pulse_length and adaptive_max_1st_pulse_length.

Two restrictions, however, need to be placed on the updating process. One restriction applies to the adaptive score limits and the other applies to the adaptive first pulse length limits. To prevent the program from defining an extremely narrow score range, the minimum and maximum total scores are first compared against the target range limits, TARGET_MINIMUM_SCORE, TARGET_MAXIMUM_SCORE. If the minimum total score taken from the received signal cache, represented by the program variable minimum_score, is less than the TARGET_MINIMUM_SCORE (block 138), the adaptive value adaptive_minimum_score is updated to minimum_score as indicated at block 140. Otherwise, adaptive_minimum_score is updated to the lower target zone score limit, TARGET_MINIMUM_SCORE as indicated at block 139. Likewise, if the maximum total, represented by program variable maximum_score, is greater than the TARGET_MAXIMUM_SCORE (block 142 in FIG. 13G), the adaptive value adaptive_maximum_score is updated to the maximum_score as indicated at block 144. Otherwise, adaptive_minimum_score is updated to the upper target zone score limit, TARGET_MAXIMUM_SCORE, as indicated at block 143.

Figure 13G:
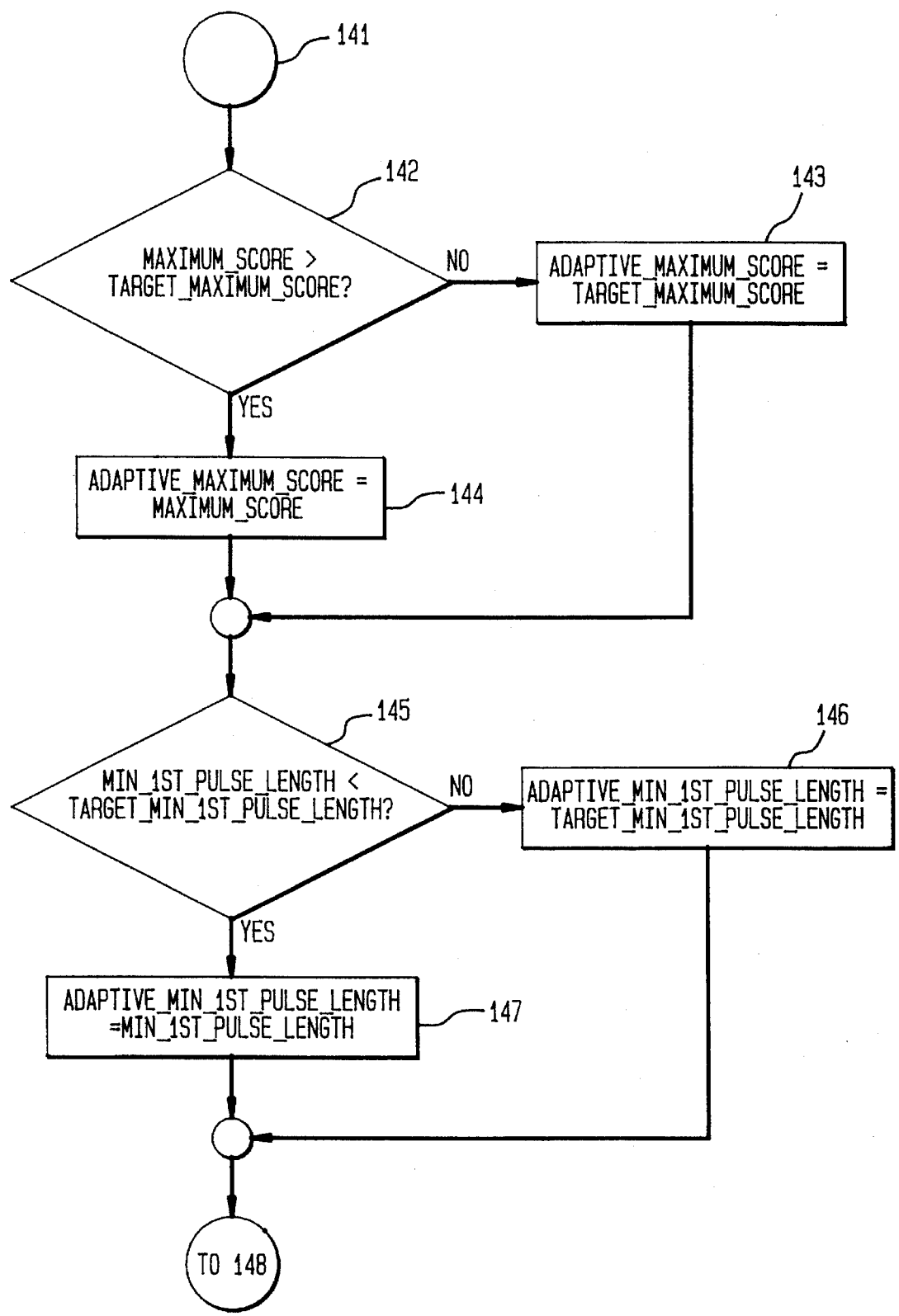
Figure 13H:
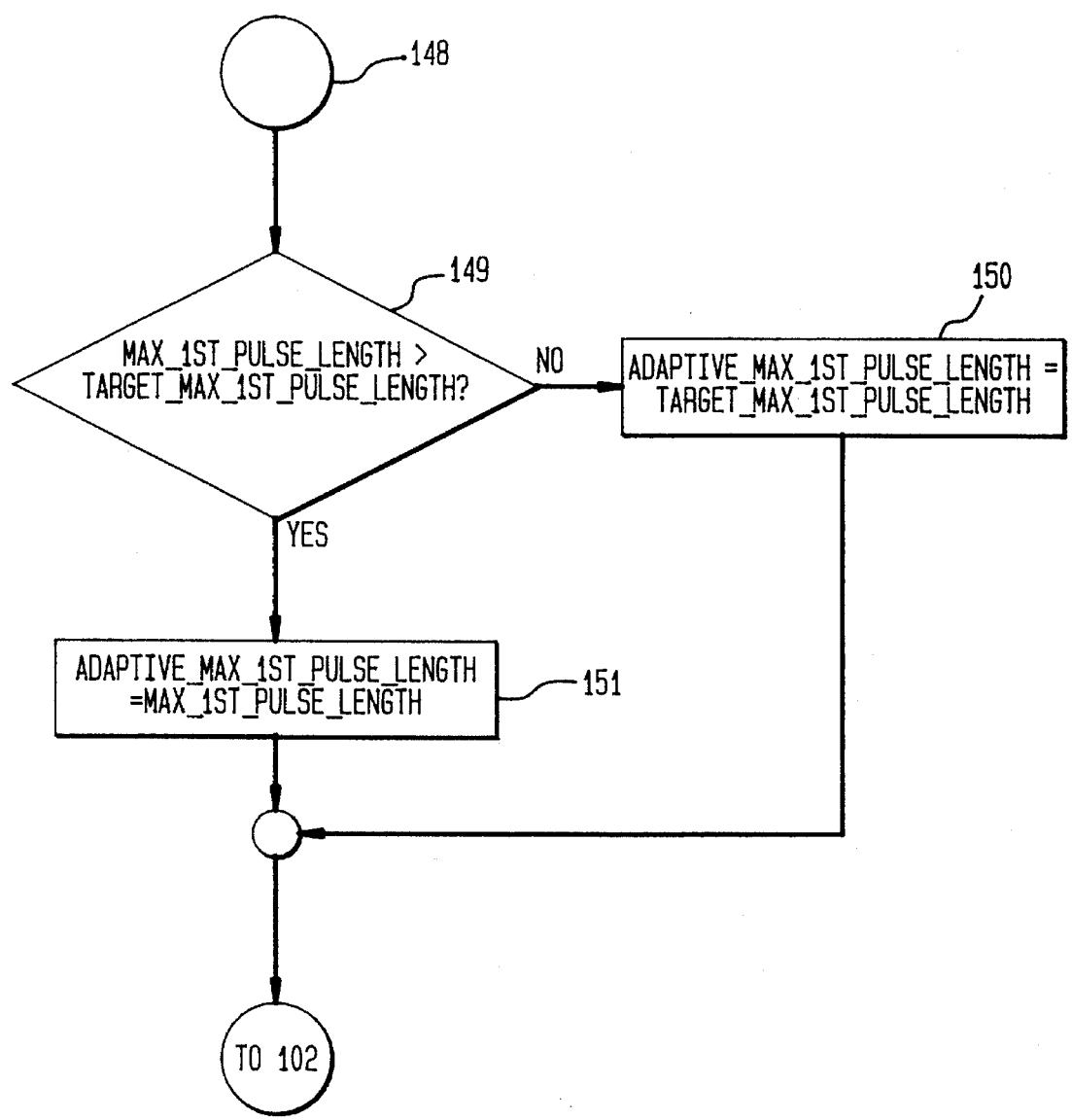

Similarly, to prevent the program from defining an extremely narrow first pulse length range, the minimum and maximum first pulse lengths are compared against the target range limits, TARGET_MINIMUM_1ST_PULSE_LENGTH and TARGET_MAXIMUM_1ST_PULSE_LENGTH (block 145 in FIG. 13G and block 149 in FIG. 13H, respectively), before the adaptive values adaptive_min_1st_pulse_length and adaptive_max_1st_pulse_length are updated. In FIG. 13G, if the minimum first pulse length in the received signal cache, represented by program variable min_1st_pulse_length, is less than the TARGET_MINIMUM_1ST_PULSE_LENGTH at block 145, the adaptive value adaptive_min_1st_pulse_length is updated to min_1st_pulse_length as indicated at block 147. Otherwise, the adaptive_min_1st_pulse_length is updated to the lower target zone limit, TARGET_MINIMUM_1ST_PULSE_LENGTH as indicated at block 146. Likewise in FIG. 13H, if the maximum first pulse length, represented by program variable max_1st_pulse_length, is greater than the TARGET_MAXIMUM_1ST_PULSE_LENGTH at block 149, the adaptive variable adaptive_min_1st_pulse_length is updated to max_1st_pulse_length as indicated at block 151. Otherwise, the adaptive_max_1st_pulse_length is updated to the upper target zone limit, TARGET_MAXIMUM_1$ST_{13}$ PULSE_LENGTH as indicated at block 150.

Once the adaptive values have been updated, the program is idled and begins looking for the next logic 1 transition on the composite signal. All composite signal signatures received will now be evaluated based upon the updated new program parameters. These parameters will stay in effect until the received signal cache is refilled. Consequently, the size of the received signal cache determines the rate at which the program parameters are adaptively updated. Smaller caches will result in faster updates while larger caches will update at a slower rate. It is recommended that the size of the received signal cache be between 10 and 20 records.

In summary, the SLL adaptive timing algorithm provides improved talkoff and talkdown performance. Improvements in talkoff performance are realized through using feedback about alerting signal detection decisions to identify, record and maintain a list of the composite signal signature characteristics of talkoff speech signals for the purposes of screening all potential alerting signals to recognize and eliminate duplicate or repetitive talkoff signals. Talkdown and talkoff performance is further enhanced by the adaptive nature of the alerting signal determination parameters. These parameters are adaptively adjusted to optimize the detector performance around the speech levels, transmission channel losses and alerting signal generator characteristics of the signaling environment.

The SLL algorithm introduces the concepts of adaptively changing program parameters based upon the characteristics of received signals and storing the characteristics of known talkoffs signals to help identify duplicate false signals. These concepts can be extended to other program parameters as well. For instance, one other variable that can be adaptively adjusted is a limit on the amount of observed skew between comparison signals after delay compensation. Besides the delay introduced by filtering operations, speech can also cause skew in the comparison signals. By monitoring the skew, talkoff signals can more easily be recognized because it is unlikely that speech will produce two non-harmonically related frequencies starting and ending at the same points in time. This skew, either at the leading or trailing edges of the comparison signals, can be stored in the received signal cache for valid signals or stored in the talkoff signal cache for talkoff signals. It can be adaptively adjusted based on the skew characteristics in the received signal cache and can help make talkoff identification more discriminating and accurate. Overall talkoff performance will improve.

The above-described embodiments are illustrative of the principles of the present invention. Other embodiments could be devised by those skilled in the art without departing from the spirit and scope of the present invention.

What is claimed is:

1. A method for detecting on a telephone line in the presence of speech, music, or other background noise an alerting signal comprising a signaling tone at a predetermined frequency within the voiceband of the telephone line to achieve concurrently both talkoff and talkdown protection, the method comprising the steps of:

comparing the energy in said signal in a narrow frequency band around said predetermined frequency with the energy in said signal in an associated guard band portion of the voiceband as the amplitude of the energy in that guard band is weighted as a function of frequency with an associated weighting factor;

forming a time varying binary pulse signal that has a preselected binary value whenever the ratio between the energy in said narrow frequency band and the weighted energy in said guard band exceeds a predetermined threshold; and analyzing said time varying binary pulse signal to determine whether said alerting signal is present.

2. The method of claim 1 wherein the step of analyzing said time varying binary signal comprises the step of timing the length of each pulse in said time varying binary signal at said preselected binary value.

3. The method of claim 2 wherein the alerting signal comprises a plurality of signaling tones at different predetermined frequencies.

4. The method of claim 3 further comprising the steps of:

comparing for each of said predetermined frequencies the energy in said tones in a narrow frequency band around each said predetermined frequency with the energy in said tones in an associated guard band portion of the voiceband as the amplitude of the energy in that associated guard band is weighted as a function of frequency with an associated weighting function;

forming a plurality of time varying binary pulse signals each associated with one of said predetermined frequencies that each has said preselected binary value whenever the ratio of the energy in the associated narrow frequency band to the weighted energy in the associated guard band exceeds a predetermined threshold;

logically ANDing each of said time varying binary pulse signals to form a time varying composite binary pulse signal that has said preselected binary value when each of said time varying binary pulse signals has said preselected binary value; and analyzing said composite binary pulse signal to determine whether said alerting signal is present.

5. The method of claim 4 wherein the step of analyzing said composite binary pulse signal comprises the step of timing the length of each pulse in said composite binary pulse signal at said preselected binary value.

6. The method of claim 5 further comprising the steps of:

determining the length of said each pulse occurring in a time window beginning with a first pulse at said preselected binary value of length greater than a predetermined absolute minimum first pulse length;

assigning a score to the length of said each pulse within said time window;

totaling the score for all pulses within said time window; and determining that an alerting signal is present when both the total score falls between an adaptive minimum total score and an adaptive maximum total score and the first pulse length falls between an adaptive minimum first pulse length and an adaptive maximum first pulse length.

7. The method of claim 6 further comprising the step of periodically adjusting said adaptive minimum and maximum total scores and said adaptive minimum and maximum first pulse lengths in accordance with the scores and first pulse lengths of previous alerting signals.

8. The method of claim 7 further comprising the step of determining that a talkoff and not an alerting signal is present when the total score falls between said adaptive minimum and maximum total scores and the first pulse length falls between said adaptive minimum and maximum first pulse lengths, but the total score and the first pulse length match the total score and first pulse length of a previously identified talkoff.

9. The method of claim 7 wherein said adaptive minimum total score can only be adjusted within a range defined between a predetermined target minimum total score and a predetermined floor score, said adaptive maximum total score can only be adjusted within a range defined between a predetermined target maximum total score and a predetermined ceiling score, said adaptive minimum first pulse length can only be adjusted within a range defined between a predetermined target minimum first pulse length and said predetermined absolute minimum first pulse length, and said adaptive maximum first pulse length can only be adjusted within a range defined between a predetermined target maximum first pulse length and a predetermined absolute maximum first pulse length.

10. Apparatus for detecting on a telephone line in the presence of speech, music, or other background noise an alerting signal comprising a signaling tone at a predetermined frequency within the voiceband of the telephone line to achieve concurrently both talkoff and talkdown protection comprising:

means for comparing the energy in said signal in a narrow frequency band around said predetermined frequency with the energy in said signal in an associated guard band portion of the voiceband as the amplitude of the energy in that guard band is weighted as a function of frequency with an associated weighting function;

means for forming a time varying binary pulse signal that has a preselected binary value whenever the ratio of the energy in said narrow frequency band to the weighted energy in said guard band exceeds a predetermined threshold; and means for analyzing said time varying binary pulse signal to determine whether said alerting signal is present.

11. Apparatus in accordance with claim 10 wherein said means for analyzing said time varying binary signal comprises means for timing the length of each pulse in said time varying binary pulse signal at said preselected binary value.

12. Apparatus in accordance with claim 11 wherein the alerting signal comprises a plurality of signaling tones at different predetermined frequencies.

13. Apparatus in accordance with claim 12 further comprising:

means for comparing for each of said predetermined frequencies the energy in said tones in a narrow frequency band around said predetermined frequency with the energy in said tones in an associated guard band portion of the voiceband as the amplitude of the energy ion that associated guard band is weighted as a function of frequency with an associated weighting function;

means for forming a plurality of time varying binary pulse signals each associated with one of said predetermined frequencies that each has said preselected binary value whenever the ratio between the energy in the associated narrow band and the weighted energy in the associated guard band exceeds a predetermined threshold;

means for logically ANDing each of said time varying binary pulse signals to form a time varying composite binary pulse signal that has said preselected binary value when each of said time varying binary pulse signals has said predetermined binary value; and means for analyzing said composite binary pulse signal to determine whether said altering signal is present.

14. Apparatus in accordance with of claim 13 wherein said means for analyzing said composite binary pulse signal comprises means for timing the length of said each pulse at said preselected binary value in said composite signal.

15. Apparatus in accordance with claim 14 further comprising:

means for determining the length of said each pulse occurring in a time window beginning with a first pulse at said preselected binary value of length greater than a predetermined absolute minimum first pulse length;

means for assigning a score to the length of said each pulse within said time window;

means for totaling the score for all pulses within said time window; and means for determining that an alerting signal is present when both the total score falls between an adaptive minimum total score and an adaptive maximum total score and the first pulse length falls between an adaptive minimum first pulse length and an adaptive maximum first pulse length.

16. Apparatus in accordance with claim 15 further comprising means for periodically adjusting said adaptive minimum and maximum total scores and said adaptive minimum and maximum first pulse lengths in accordance with the scores and first pulse lengths of previous alerting signals.

17. Apparatus in accordance with of claim 16 further comprising means for determining that a talkoff and not an alerting signal is present when the total score falls between said adaptive minimum and maximum total scores and the first pulse length falls between said adaptive minimum and maximum first pulse lengths, but the total score and the first pulse length match the total score and first pulse length of a previously identified talkoff.

18. Apparatus in accordance with claim 16 wherein said adaptive minimum total score can only be adjusted within a range defined between a predetermined target minimum total score and a predetermined floor score, said adaptive maximum total score can only be adjusted within a range defined between a predetermined target maximum total score and a predetermined ceiling score, said adaptive minimum first pulse length can only be adjusted within a range defined between a predetermined target minimum first pulse length and said predetermined absolute minimum first pulse length, and said adaptive maximum first pulse length can only be adjusted within a range defined between a predetermined target maximum first pulse length and a predetermined absolute maximum first pulse length.

* * * * *